US011023678B2

(12) United States Patent
Van Belle et al.

(10) Patent No.: US 11,023,678 B2
(45) Date of Patent: *Jun. 1, 2021

(54) USER INTERFACE FOR A HANDHELD DEVICE

(71) Applicant: BlackBerry Limited, Waterloo (CA)

(72) Inventors: Theodore Van Belle, Waterloo (CA); Scotte Zinn, Kitchener (CA); Andrew Douglas Bocking, Los Altos, CA (US); Michael Thomas Hardy, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,048

(22) Filed: Nov. 7, 2019

(65) Prior Publication Data

US 2020/0073930 A1 Mar. 5, 2020

Related U.S. Application Data

(63) Continuation of application No. 15/861,471, filed on Jan. 3, 2018, now Pat. No. 10,474,754, which is a (Continued)

(51) Int. Cl.
*G06F 3/0482* (2013.01)
*G06F 40/274* (2020.01)
(Continued)

(52) U.S. Cl.
CPC .......... *G06F 40/274* (2020.01); *G06F 3/0482* (2013.01); *G06F 3/04842* (2013.01);
(Continued)

(58) Field of Classification Search
CPC .................................................... G06F 3/0482
(Continued)

(56) References Cited

U.S. PATENT DOCUMENTS

| 5,444,841 A * | 8/1995 | Glaser | G06F 3/0481 715/224 |
| 5,905,494 A * | 5/1999 | Krosner | G06F 3/0482 715/866 |

(Continued)

OTHER PUBLICATIONS

Installation and Users Guide—iPAQ BlackBerry H1100 Handheld, Research in Motion Limited, Canada, cover page, second page, Aug. 21, 2000, pp. 25, 29, and 131-133.
(Continued)

*Primary Examiner* — Daniel Rodriguez
(74) *Attorney, Agent, or Firm* — Borden Ladner Gervais LLP; Todd Keeler

(57) ABSTRACT

A user interface and method for composing a message to be sent over a wireless network environment using a handheld device is disclosed. According to the method, upon receipt of a user request to compose a message, a screen is displayed with a recipient field for a recipient address, an associated label to indicate that the recipient field is for a recipient address, and a message body field for holding message content. The method further includes, upon each keystroke entry of text to the recipient field, looking up entries from an address book which match the text, and displaying a selection menu representing addresses from at least a portion of the entries as well as cached entries previously looked up from a global address book.

24 Claims, 23 Drawing Sheets

Related U.S. Application Data continuation of application No. 14/656,985, filed on Mar. 13, 2015, now Pat. No. 9,898,456, which is a continuation of application No. 13/608,607, filed on Sep. 10, 2012, now Pat. No. 8,984,411, which is a continuation of application No. 13/253,513, filed on Oct. 5, 2011, now Pat. No. 8,280,972, which is a continuation of application No. 11/554,356, filed on Oct. 30, 2006, now Pat. No. 8,037,142, which is a continuation-in-part of application No. 11/421,832, filed on Jun. 2, 2006, now Pat. No. 7,953,804.

(51) Int. Cl.
| | |
|---|---|
| H04M 1/2748 | (2020.01) |
| H04M 1/72436 | (2021.01) |
| H04W 4/00 | (2018.01) |
| G06F 3/0484 | (2013.01) |
| H04W 4/12 | (2009.01) |
| H04W 8/26 | (2009.01) |
| H04W 88/02 | (2009.01) |

(52) U.S. Cl.
CPC ..... *H04M 1/2748* (2020.01); *H04M 1/72436* (2021.01); *H04W 4/00* (2013.01); *H04W 4/12* (2013.01); *H04W 8/26* (2013.01); *H04W 88/02* (2013.01)

(58) Field of Classification Search
USPC .......................................................... 715/739
See application file for complete search history.

(56) References Cited

U.S. PATENT DOCUMENTS

| | | | | |
|---|---|---|---|---|
| 6,137,488 | A | * | 10/2000 | Kraft .................. G06F 3/04895 715/866 |
| 6,321,257 | B1 | * | 11/2001 | Kotola .................... H04W 4/14 455/41.1 |
| 6,788,319 | B2 | | 9/2004 | Matsumoto et al. |
| 6,829,607 | B1 | | 12/2004 | Tafoya et al. |
| 6,867,763 | B2 | | 3/2005 | Griffin et al. |
| 6,871,215 | B2 | | 3/2005 | Smith et al. |
| 6,944,610 | B2 | | 9/2005 | Moore et al. |
| 7,076,730 | B1 | | 7/2006 | Baker |
| 7,091,885 | B2 | | 8/2006 | Fux et al. |
| 7,155,683 | B1 | | 12/2006 | Williams |
| 7,155,725 | B1 | | 12/2006 | Kister et al. |
| 7,181,497 | B1 | | 2/2007 | Appelman et al. |
| 7,257,122 | B1 | * | 8/2007 | Keturi .................... H04L 67/04 370/401 |
| 7,392,254 | B1 | * | 6/2008 | Jenkins .................. G06Q 10/10 |
| 7,660,611 | B1 | * | 2/2010 | Asbury .................. G06F 1/3271 455/574 |
| 7,853,656 | B2 | | 12/2010 | Yach et al. |
| 7,953,804 | B2 | | 5/2011 | Van Belle et al. |
| 8,037,142 | B2 | | 10/2011 | Van Belle et al. |
| 8,280,972 | B2 | | 10/2012 | Van Belle et al. |
| 8,984,411 | B2 | | 3/2015 | Van Belle et al. |
| 9,898,456 | B2 | | 2/2018 | Van Belle et al. |
| 10,474,754 | B2 | | 11/2019 | Van Belle et al. |
| 2002/0032743 | A1 | | 3/2002 | Lee et al. |
| 2002/0190946 | A1 | | 12/2002 | Metzger |
| 2003/0048298 | A1 | * | 3/2003 | Ellendman ........... G06Q 10/107 715/752 |
| 2003/0093483 | A1 | | 5/2003 | Allen et al. |
| 2003/0095102 | A1 | | 5/2003 | Kraft et al. |
| 2003/0104839 | A1 | | 6/2003 | Kraft et al. |
| 2003/0122922 | A1 | | 7/2003 | Saffer et al. |
| 2004/0119732 | A1 | * | 6/2004 | Grossman ............. G06Q 10/10 715/708 |
| 2004/0122905 | A1 | | 6/2004 | Smith et al. |
| 2004/0135806 | A1 | * | 7/2004 | Pickering ............. G06F 40/177 715/760 |
| 2004/0181580 | A1 | | 9/2004 | Baranshamaje |
| 2004/0254989 | A1 | * | 12/2004 | Baratakke ............... H04L 51/28 709/206 |
| 2005/0007455 | A1 | * | 1/2005 | Yamazaki ......... H04M 1/72555 348/207.99 |
| 2005/0050547 | A1 | * | 3/2005 | Whittle ................. G06F 16/252 719/310 |
| 2005/0169213 | A1 | * | 8/2005 | Scian .................. H04M 1/2757 370/329 |
| 2005/0197725 | A1 | * | 9/2005 | Alexander ........... G11B 27/329 700/94 |
| 2005/0198144 | A1 | * | 9/2005 | Kraenzel ............. G06Q 10/107 709/206 |
| 2005/0198180 | A1 | | 9/2005 | Khanolkar et al. |
| 2006/0004843 | A1 | * | 1/2006 | Tafoya ................. G06Q 10/107 |
| 2006/0026244 | A1 | * | 2/2006 | Watson .................... H04L 51/28 709/206 |
| 2006/0035632 | A1 | * | 2/2006 | Sorvari ............. H04M 1/72547 455/418 |
| 2006/0075120 | A1 | | 4/2006 | Smit |
| 2006/0088356 | A1 | | 4/2006 | Jawerth et al. |
| 2006/0095510 | A1 | | 5/2006 | Rouse et al. |
| 2006/0123354 | A1 | | 6/2006 | Volovitz |
| 2006/0135135 | A1 | * | 6/2006 | Rybak .................... H04W 88/02 455/414.1 |
| 2006/0159507 | A1 | | 7/2006 | Jawerth et al. |
| 2006/0213968 | A1 | | 9/2006 | Guest et al. |
| 2006/0218503 | A1 | * | 9/2006 | Matthews ............. G06F 3/0482 715/779 |
| 2006/0223530 | A1 | | 10/2006 | Bumiller et al. |
| 2006/0242109 | A1 | * | 10/2006 | Pereira ................. G06F 40/274 |
| 2006/0288297 | A1 | * | 12/2006 | Haitani ............. H04M 1/72547 715/739 |
| 2006/0288298 | A1 | * | 12/2006 | Haitani ................... H04L 51/28 715/739 |
| 2007/0011155 | A1 | | 1/2007 | Sarkar |
| 2007/0118759 | A1 | | 5/2007 | Sheppard |
| 2007/0124272 | A1 | * | 5/2007 | DeCastra ............... G06Q 10/00 |
| 2007/0233788 | A1 | * | 10/2007 | Bender ................. G06Q 10/107 709/206 |
| 2007/0244973 | A1 | | 10/2007 | Pearson |
| 2009/0036106 | A1 | | 2/2009 | Guest et al. |
| 2009/0157828 | A1 | | 6/2009 | Agrawal |
| 2015/0186356 | A1 | | 7/2015 | Van et al. |

OTHER PUBLICATIONS

Research in Motion Limited, "Installation and User's Guide, iPAQ BlackBerry H1100 Handheld," Canada, cover page, Aug. 21, 2000, pp. 2-217.

U.S. Appl. No. 13/608,607, Non-Final Office Action dated Jun. 19, 2014.

U.S. Appl. No. 13/608,607, Notice of Allowance dated Nov. 10, 2014.

U.S. Appl. No. 14/656,985, Final Office Action dated Jun. 19, 2017.

U.S. Appl. No. 14/656,985, Non final Office action dated Feb. 14, 2017.

U.S. Appl. No. 14/656,985, Notice of Allowance dated Oct. 10, 2017.

U.S. Appl. No. 15/861,471, Notice of Allowance dated Jul. 10, 2019.

* cited by examiner

USER INTERFACE FOR A HANDHELD DEVICE

BACKGROUND OF THE INVENTION

The present patent document relates generally to user interface design and more particularly to the design of user interfaces for applications running on handheld communication devices.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyright rights whatsoever.

Handheld devices such as Personal Digital Assistants (PDAs), cellular phones, portable computing devices and other two-way data and/or voice communication devices, are increasing in popularity as they have become more feature-rich at an ever decreasing cost to the consumer. In particular, handheld devices that allow both voice and data communication are almost indispensable tools in certain businesses and government agencies. The need to maintain electronic mail communication as well as a variety of related information management applications such as electronic calendars, contacts and address books, without impeding mobility are among the critical factors driving the demand for handheld communication devices. Popular handheld devices include those supplied by Research In Motion Ltd. of Waterloo, Ontario, Canada.

However, some applications running on handheld devices may be cumbersome to use. This is partly due to the limitations of the hardware although user interface design also plays a part. Handheld devices must, by definition, be easily portable and convenient to carry around. This entails that the handheld devices must have a small form-factor and be sufficiently light for mobile use. Unfortunately, the small size of a mobile handheld device limits the available physical means for data entry, data output and general interaction with a user. Both the data entry pad or keyboard and viewable screen size of a handheld device are necessarily small compared with personal computers or workstations. Moreover, the use of a peripheral input device such as a mouse is awkward or impractical for handheld devices, as the peripheral is often almost as large as the handheld itself. In addition, handheld devices are often battery operated. Battery operated devices must pay particular attention to power consumption as power is a very limited resource. It is thus advantageous, for power conservation purposes, to minimize the number of components that consume power.

Therefore it is often challenging for applications running on handheld devices to offer user interface features that are as rich and as convenient to use as those offered by their counterparts running on PCs and workstations. PCs have much larger screens, bigger keyboards and may easily use additional peripheral input devices such as a mouse. Conventional applications running on handheld devices thus typically offer user interfaces that are less familiar and may sometimes be confusing to use. Approaches to solve user interface problems have tended to focus on the design of small form-factor keyboard layouts for optimal thumb-based data entry, such as the solution taught by U.S. Pat. No. 6,867,763 granted to Research In Motion Ltd.

However, the visual aspects of data entry interfaces in handheld devices for common applications, such as email client software, still tend to be different from those offered by the desktop equivalents, due primarily to the limitations of screen size. These differences in the user interfaces between handheld versions and desktop versions of similar applications are disadvantageous. For example, the typical handheld user is almost always familiar with a desktop email client and is therefore likely to be inconvenienced by a user interface on a handheld that is very different. Further, composing an email message using conventional email clients on handhelds often entails an excessive use of menu driven input. Accordingly, there is a need for applications running on handheld devices that mimic some of the desirable aspects of user interfaces of corresponding desktop applications. Advantageously, a better user interface would make handheld devices more convenient and enjoyable to use.

BRIEF DESCRIPTION OF THE DRAWINGS

Aspects and features of the disclosed device and method will become apparent to those of ordinary skill in the art upon review of the following description of specific embodiments in conjunction with the accompanying figures. In the figures which illustrate example embodiments.

DETAILED DESCRIPTION

A handheld device and method for composing an email message to be sent over a wireless network environment is disclosed. In accordance with one aspect, a method of operation of a handheld device is disclosed. According to the method, upon receipt of a user request to compose an e-mail, a screen is displayed with a recipient field for a recipient address, an associated label to indicate that the recipient field is for a recipient address, and a message body field for holding message content. The method further includes, upon each keystroke entry of text to the recipient field, looking up entries from an address book which match the text, and displaying a selection menu representing addresses from at least a portion of the entries. In accordance with another aspect, a handheld device loaded with an email client is disclosed. The email client includes processor executable instructions that allow a user to compose an email message to send to a server computer over a network. The email client on the handheld device displays a screen with a recipient field for a recipient address, an associated label to indicate that the recipient field is for a recipient address, and a message body field for holding message content. The device further looks up entries from an address book which match text typed into the recipient field, and displays a selection menu representing addresses from at least a portion of the entries.

Figure 1:
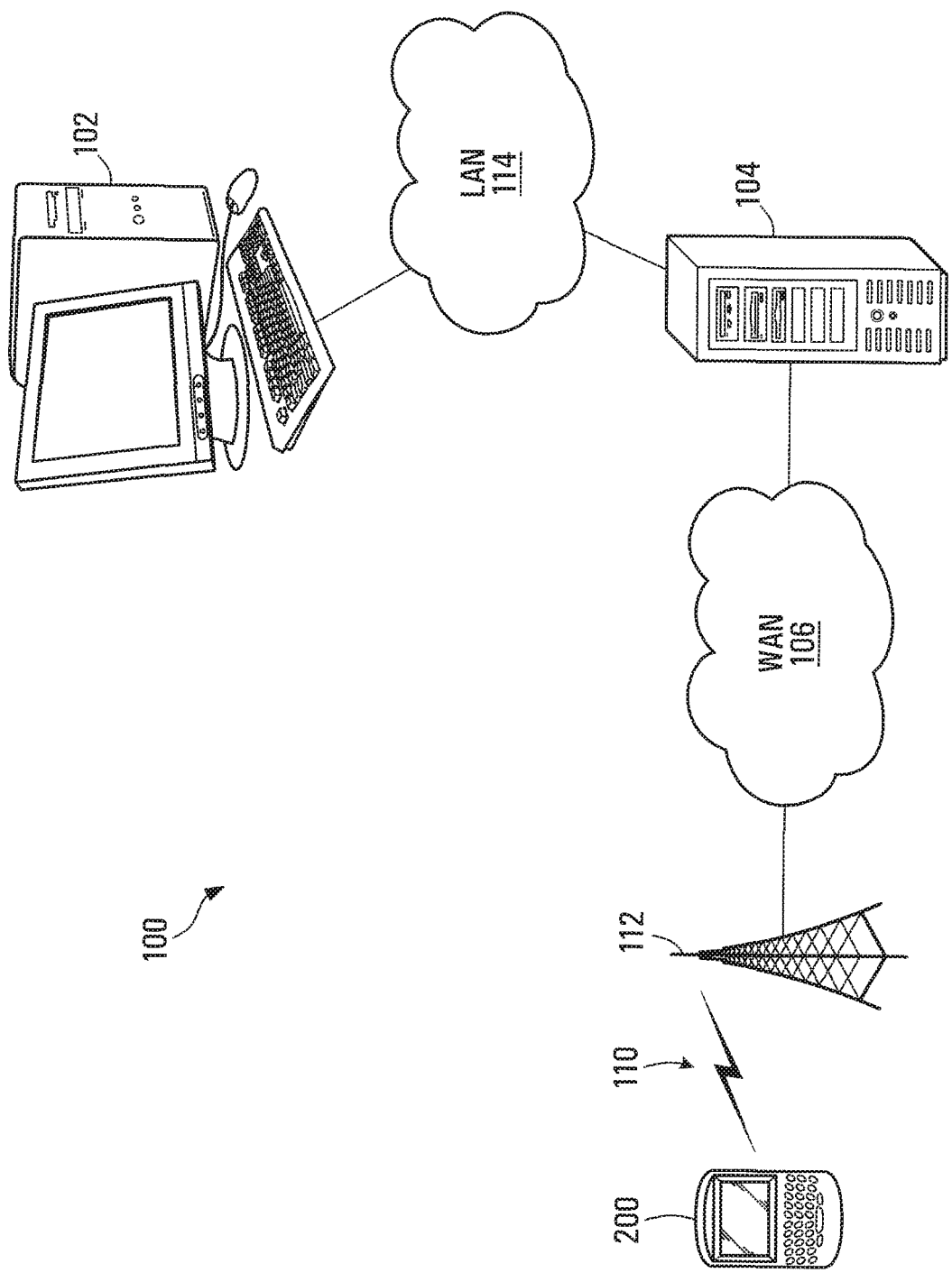
FIG. 1 is a schematic diagram depicting a typical networked environment in which a handheld computing device may be used.

FIG. 1 shows a schematic diagram depicting a typical networked environment 100 in which an exemplary handheld computing device 200 may be used. Networked environment 100 includes a desktop computing device 102, a server computer 104, a wide area network (WAN) 106, a communications network 110 and handheld device 200. Server 104 includes email server software, and is interconnected with a desktop computer 102 through a local area network (LAN) 114. Server 104 additionally includes software that facilitates access to the email server software by handheld device 200.

A radio frequency (RF) base station 112 provides a communication link between WAN 106, which may be the public Internet, and a communications network 110, which may be a wireless network. Handheld device 200 accesses data from server 104 or desktop computer 102 through the communications network 110 and WAN 106. In some network architectures, a firewall may be implemented between WAN 106 and server computer 104 to gate access to LAN, 114 which may be a corporate LAN.

Handheld device 200 is loaded with email client software that accesses email messages, stored in mail server software such as Microsoft Exchange or Lotus Domino software, running on server 104. To facilitate data access by handheld device 200, server 104 may be loaded with specialized software to provide compression, encryption and a data interface with the mail server software.

Figure 2:
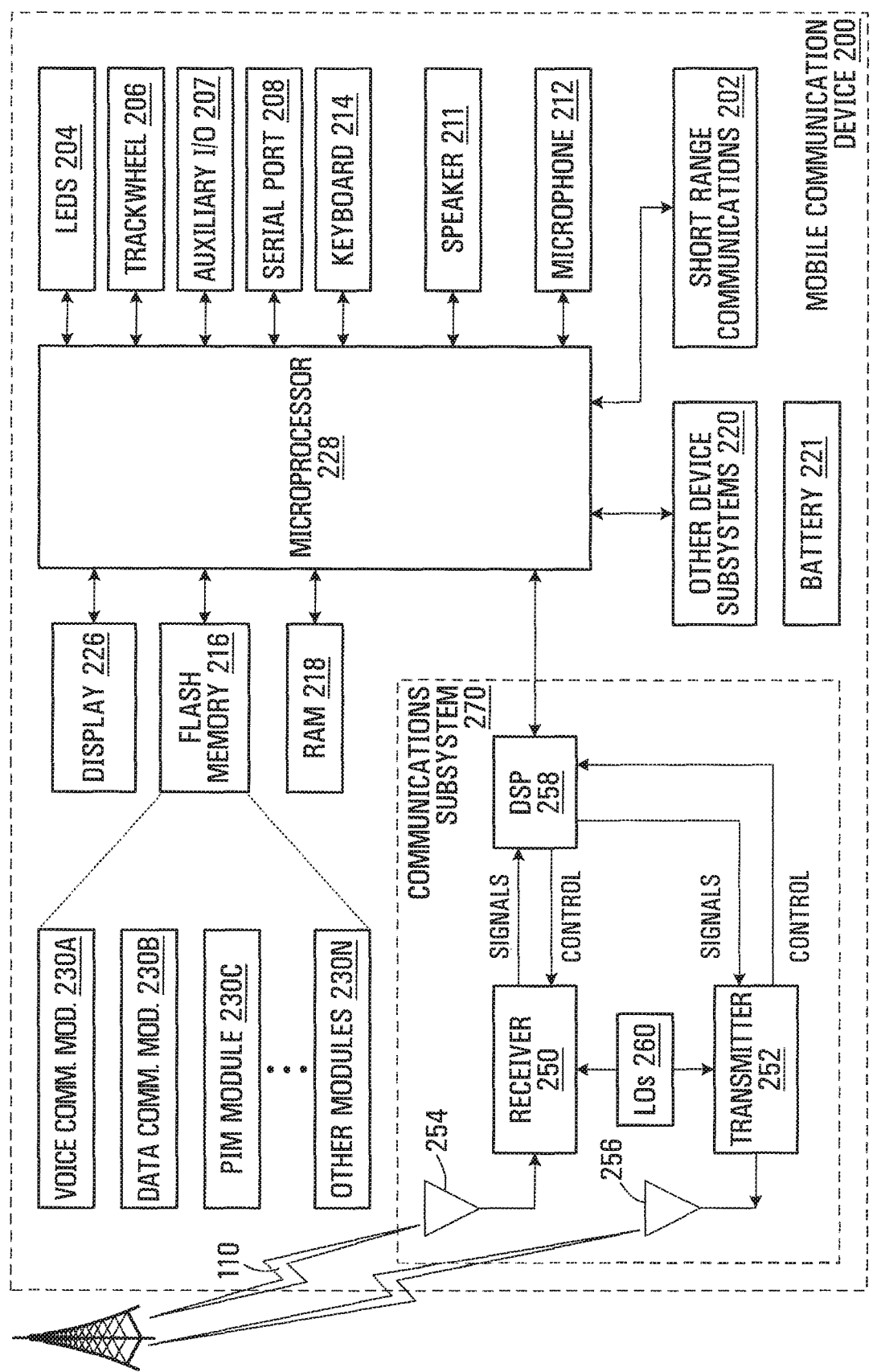
FIG. 2 is a block diagram of the various components of a handheld device.

FIG. 2 is a schematic diagram of exemplary handheld mobile communication device 200. Device 200 includes a housing, an input device (keyboard 214), and an output device (display 226), which may be a full graphic Liquid Crystal Display (LCD). Other types of output devices may alternatively be utilized. A processing device (microprocessor 228) is shown schematically in FIG. 2 as coupled between the keyboard 214 and the display 226. The microprocessor 228 controls the operation of the display 226, as well as the overall operation of the handheld device 200, in response to actuation of keys on the keyboard 214 by a user.

The housing may be elongated vertically, or may take on other sizes and shapes (including clamshell housing structures). The keyboard may include a mode selection key, or other hardware or software for switching between text entry and telephony entry.

In addition to the microprocessor 228, other parts of the handheld device 200 are shown schematically in FIG. 2. These include: a communications subsystem 270; a short-range communications subsystem 202; the keyboard 214 and the display 226, along with a trackwheel (or trackball) 206 and other auxiliary input/output devices 207, a serial port 208, a speaker 211 and a microphone 212; as well as memory devices including a flash memory 216 and a random access memory (RAM) 218; and various other device subsystems 220. As is known, trackwheel 206 may be rotated to provide scrolling and pressed to allow selection.

The handheld device 200 has a battery 221 to power the active elements of the handheld device 200. The handheld device 200 is preferably a two-way radio frequency (RF) communication device having voice and/or data communication capabilities. In addition, the handheld device 200 may have the capability to communicate with other computer systems via the Internet.

Operating system software executed by the microprocessor 228 is preferably stored in a persistent store, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the handheld device may also be stored to the RAM 218.

The microprocessor 228, in addition to its operating system functions, enables execution of software applications on the handheld device 200. A predetermined set of software applications that control basic device operations, such as a voice communications module 230A and a data communications module 230B, are installed on the handheld device 200 during manufacture. The data communications module 230B allows the handling of email messages. In addition, a personal information manager (PIM) application module 230C is also installed on the handheld device 200 during manufacture. The PIM application is capable of organizing and managing data items, such as e-mail, calendar events, voice mails, appointments, and task items. The PIM application is also capable of sending and receiving data items via wireless network 110. The data items managed by the PIM application are seamlessly integrated, synchronized and updated via the wireless network with the device user's corresponding data items stored or associated with a host computer system. As well, additional software modules, illustrated as other software modules 230N, may be installed during manufacture.

Communication functions, including data and voice communications, are performed through the communication subsystem 270, and possibly through the short-range communications subsystem 202. The communication subsystem 270 includes a receiver 250, a transmitter 252 and one or more antennas, illustrated as a receive antenna 254 and a transmit antenna 256. In addition, the communication subsystem 270 also includes a processing module, such as a digital signal processor (DSP) 258, and local oscillators (LOs) 260. The specific design and implementation of the communication subsystem 270 is dependent upon the communication network in which the handheld device 200 is intended to operate. For example, the communication subsystem 270 of the handheld device 200 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the handheld device 200.

Network access requirements vary depending upon the type of communication system. For example, in the Mobitex™ and DataTAC™ networks, handheld devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, the handheld device 200 may send and receive communication signals over the communication network 110. Signals received from the communication network 110 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the network 110 are processed (e.g., modulated and encoded) by the DSP 258 and are then provided to the transmitter 252 for digital to analog conversion, frequency up conversion, filtering, amplification and transmission to the communication network 110 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 270 and is input to the microprocessor 228. The received signal is then further processed by the microprocessor 228 for an output to the display 226, or alternatively to some other auxiliary I/O devices 207. A device user may also compose data items, such as e-mail messages, using the keyboard 214, a trackwheel 206 (as for example a thumbwheel) and/or some other auxiliary I/O device 207, such as a touchpad, a rocker switch, or some other type of input device. The composed data items may then be transmitted over the communication network 110 via the communication subsystem 270.

In a voice communication mode, overall operation of the device is substantially similar to the data communication mode, except that received signals are output to a speaker 211, and signals for transmission are generated by a microphone 212. Alternative voice or audio I/O subsystems, such as a voice message recording subsystem, may also be implemented on the device 200. In addition, the display 226 may also be utilized in voice communication mode, for example, to display the identity of a calling party, the duration of a voice call, or other voice call related information.

The short-range communications subsystem 202 enables communication between the handheld device 200 and other proximate systems or devices, which need not necessarily be similar devices. For example, the short-range communications subsystem may include an infrared device and associated circuits and components, or a Bluetooth™ communication module to provide for communication with similarly-enabled systems and devices.

Handheld device 200, when operating under the control of known software and device code (firmware), may be used to compose an electronic mail message to a recipient in the manner illustrated in FIGS. 3A-3D. Variations in the sequence of actions, such as the use of keyboard keys instead of the trackwheel 206, or the optional use of popup menus to alter the sequence of user interface screens, are possible.

Figure 3A:
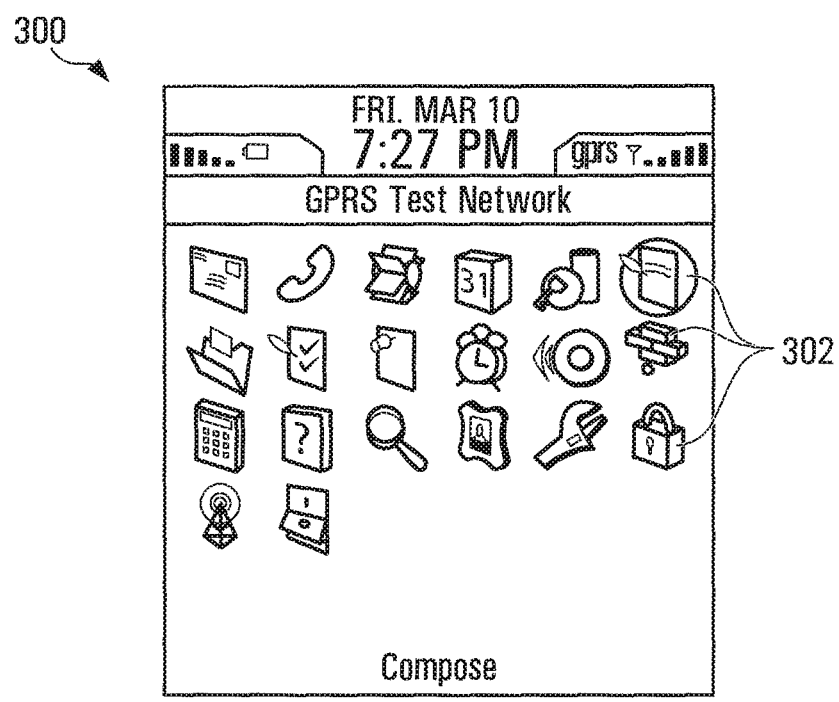
FIGS. 3A-3D are block diagrams of screenshots of the user interface of an exemplary email client executing on the handheld device of FIG. 2 in a conventional manner.
Figure 3B:
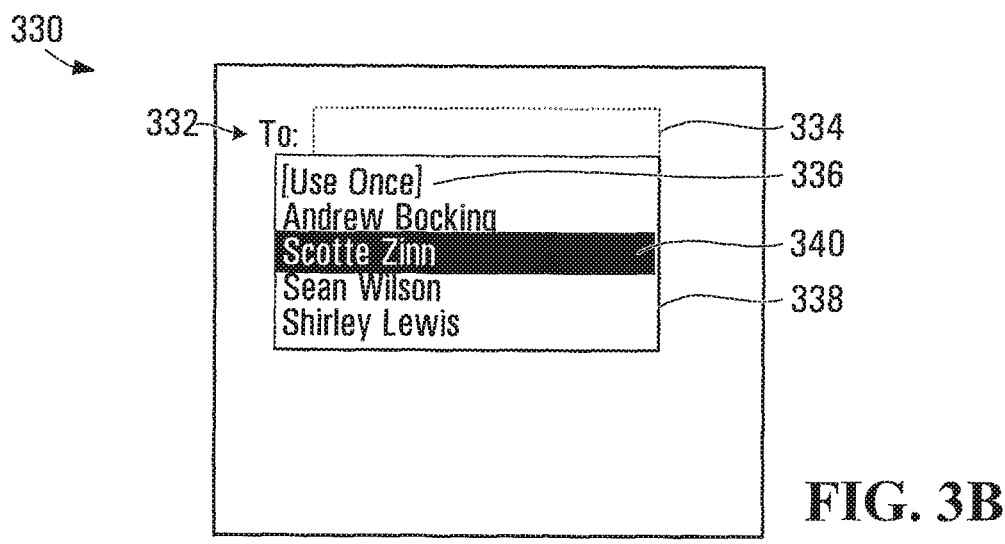

With reference to FIGS. 3A-3D along with FIG. 2, startup screen 300 (FIG. 3A) of a known email application running on the handheld device 200 includes icons 302 which are allocated labels, for example, 'Messages', 'Address book', 'Calendar', 'Compose', 'Browser' etc. Each of these icons 302 typically launches a new, appropriately tailored, user interface screen on the display 226 when selected by the user by way of the trackwheel 206 or the keyboard 214. FIG. 3B depicts an exemplary screenshot of a user interface screen, displayed by a known handheld email client when the 'Compose' icon is selected in FIG. 3A. The depicted user interface 330 includes a label 332, an input field 334, a drop down address selection list 338, headed with a '[Use Once]' selection 336. One of the addresses may be highlighted as shown at email address selection 340. Label 332 reads 'To:' in an English version of the software. All labels may of course contain translated equivalents of the exemplary English labels illustrated, as needed.

The address selection list is a list of the first entries in the local address book stored in handheld device 200 headed with a '[Use Once]' entry. If the address book is empty or the intended recipient's address is not in the address book, only the '[Use Once]' option and a message line that reads '*No Addresses*' is displayed indicating that the address book is empty. The message line itself may be selectable and if selected it may prompt for a new address using a new email address entry window (not shown).

Figure 3C:
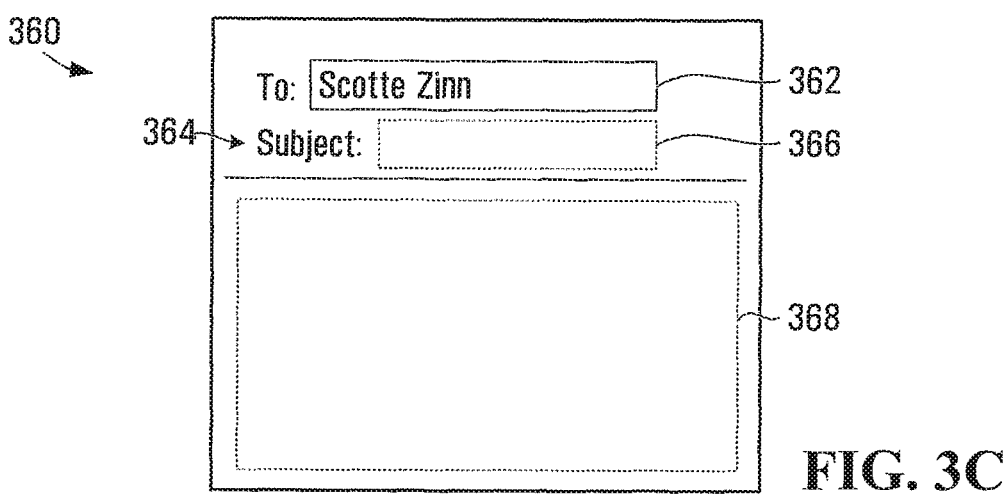

If the address book is not empty the user may select the entry 340 with the name of a recipient in the address list 338 as shown in FIG. 3B. Upon selecting a recipient, a popup menu (not shown) with a pre-selected entry that reads "email selected_name" may be presented (where selected_name is actually the name of the selected email recipient—e.g. Scotte Zinn). Once the pre-selected (highlighted) popup menu entry is selected, the screenshot 360 as depicted in FIG. 3C may be launched. Screenshot 360 includes an un-editable field 362 containing the selected recipient. A popup menu (not shown in FIG. 3C) may be invoked by way of trackwheel 206 with entries labeled as 'Add To:', 'Add Cc:', 'Add Bcc:' and 'Delete Field'. Screenshot 360 also typically includes label 364 which reads "Subject:" and fields 366 and 368 which are freeform fields for entering the subject and contents of the email being composed, respectively.

Figure 3D:
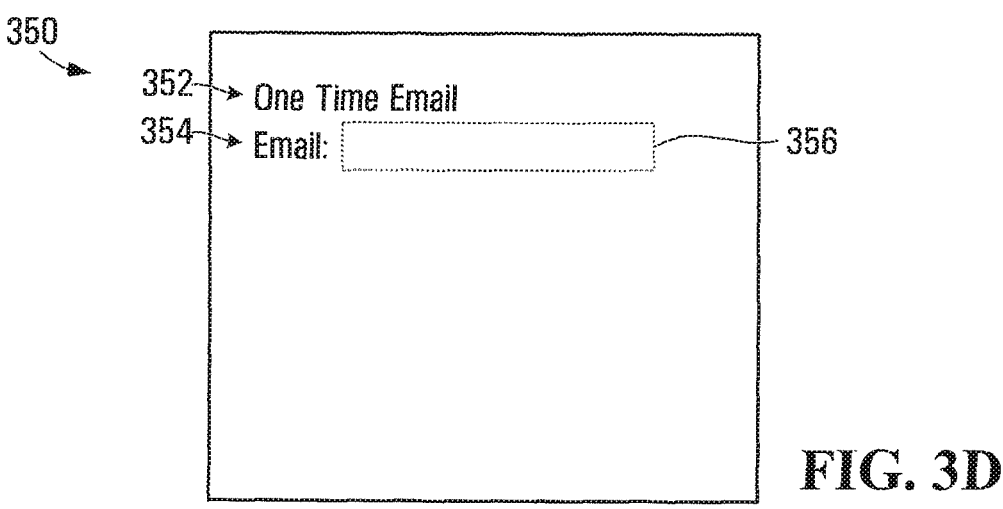

If the '[Use Once]' entry 336 (FIG. 3B) is selected using trackwheel 206 (or by tapping the 'enter' key on keyboard 214 while the '[Use Once]' entry 336 is highlighted), screenshot 350 shown in FIG. 3D is displayed. A message label 352 states 'One Time Email', while label 354 reads "Email:" and field 356 is freeform to allow typing of the recipient. Label 352 is intended to indicate to the user that the current email is for use on a one-time basis and is not retrieved from the address book. After entering the email address in field 354 and pressing the enter key (or equivalently, pressing the trackwheel), the screenshot 360 depicted in FIG. 3C appears.

It can be easily appreciated that the sequence of actions to arrive at screenshot 360 is not very intuitive or as straightforward as possible. In that regard, new users who have not synchronized their local address book in their handheld device 200 will have to undertake the steps represented by the sequence of user interfaces shown in FIGS. 3A-3D in order to send an e-mail. Furthermore, whether or not the recipient is found in the address book, the steps required to send an email using known email clients is inconsistent with the way email is composed using popular desktop email client applications such as Outlook® from Microsoft Corp.

of Redmond, Wash., USA. For example, it may not be quite clear what '[Use Once]' (in FIG. 3B) means to one who is not already well versed in the use of the handheld device executing a conventional email client. Also, the number of menu accesses to navigate through to screenshot 360 can be considerable. It is therefore likely that the user interfaces depicted in FIGS. 3B-3D may be sources of confusion and frustration to users, especially novice users.

As mentioned earlier, the sequence of user interaction described thus far results from handheld device 200 operating with known software. Several variations exist consequent upon different known software loads. However, these variations nonetheless exhibit at least some of the disadvantageous characteristics identified.

One approach to solve the user interface problems identified is to have the handheld device mimic, to the extent possible, standard user interfaces used in popular desktop applications. Conveniently, handheld device 200 may be adapted to operate in exemplary inventive manners by the way of new software loaded onto device 200.

Figure 4:
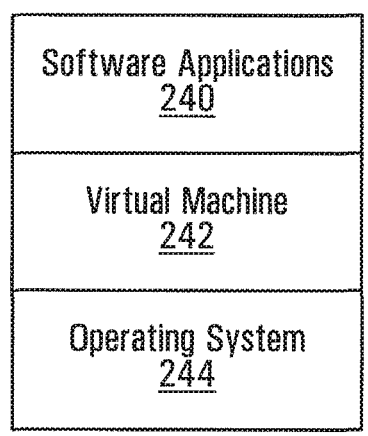
FIG. 4 depicts exemplary software architectural layers for an email client executing on the handheld device of FIG. 2.

In this regard, returning to FIG. 2, the microprocessor 218 in handheld device 200 may be used to run software applications comprising processor executable instructions. Microprocessor 228 interacting with RAM 218 and other device subsystems, may execute operating system software and other application software which may be stored in a persistent store such as flash memory 216. In addition, applications may be loaded onto handheld device 200 from an external source accessible through auxiliary I/O 207, serial port 208, short range communications subsystem 202 or other device subsystems 220, for execution by microprocessor 228. As depicted in FIG. 4, software applications 240 such as an email client, electronic calendar, or appointment organizers may execute inside a virtual machine 242 running atop an operation system 244. An exemplary virtual machine may be the K virtual machine (KVM) from Sun Microsystems Inc. of Santa Clara, Calif., USA. The applications 240 may have the ability to send and/or receive data, via the network 110.

Software applications 240, such as applications according to embodiments of this disclosure may easily be implemented using a standard programming language such as the Java™ programming language, targeting a virtual machine executing in handheld device 200. To make use of a virtual machine, an application development platform, such as the Java 2 Micro Edition (J2ME), along with a development environment which may be a variant of the Java Development Environment (JDE) from Sun Microsystems Inc., may be used to develop applications. Application developer guides for a specific development platform may be consulted to develop an application with user interfaces as disclosed herein. JDE for a particular handheld device, for example, provides a set of application programming interfaces (API) which provides access to device features including user interface, networking, localization and other capabilities. Thus, using the above resources and related hardware, software and documentation, the descriptions of embodiments of the user interface layouts provided hereinafter and associated features can be implemented in a straightforward manner by those with ordinary skill in the art. Alternately, many other programming approaches, languages and platforms may be used. For instance, the application may target the operating system of device 200 directly, or another programming language such as C or C++ may be used. The approach outlined above is thus only exemplary and in no way limiting.

A handheld device 200 operated in exemplary inventive manners may start out by launching a start up screen similar to that in FIG. 3A, and displaying icons 302 which may be labeled as 'Messages', 'Address book', 'Calendar', 'Browser' etc. Icons 302 allow the user to launch new user interface screen on display 226 (FIG. 2) when selected by trackwheel 206 or keyboard 214.

Figure 5A:
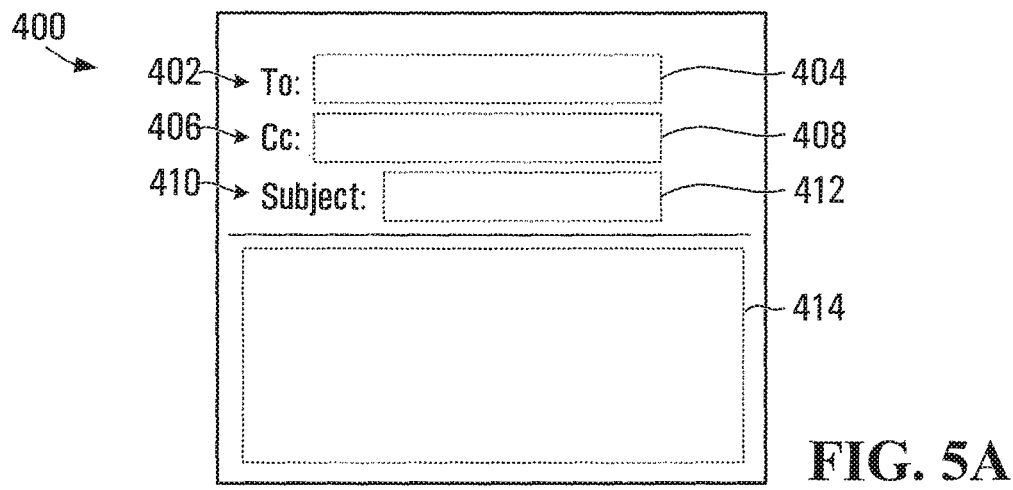
FIGS. 5A-5F are block diagrams representative of screenshots of the user interface presented to a user when executing exemplary email client software on the handheld device of FIG. 2.

Exemplary screenshots of handheld device 200 when loaded with software so as to operate in accordance with the present disclosure are depicted in FIGS. 5A-5F. FIG. 5A depicts a schematic diagram of an exemplary screenshot 400 of a handheld device 200 executing a client application launched after a selection is made to compose email. Screenshot 400 may be launched by selecting a 'Compose Email' option from a pop-up menu available when in a messages application. Alternatively, a 'Compose' icon may be present in the startup screen that launches screenshot 400 upon selection. Other ways of launching screenshot 400 starting from the startup screen may also be included.

Screenshot 400 is an exemplary email composition screen. Screenshot 400 includes labels 402, 406 and 410 which read "To:", "Cc:" and "Subject", respectively. Recipient field 404 is a freeform field in which a recipient may be entered. Field 408 is a freeform field in which copied recipients are entered. Field 412 is a free form field in which the subject heading for the email is entered while field 414 allows the message content of the email to be keyed in.

Figure 5B:
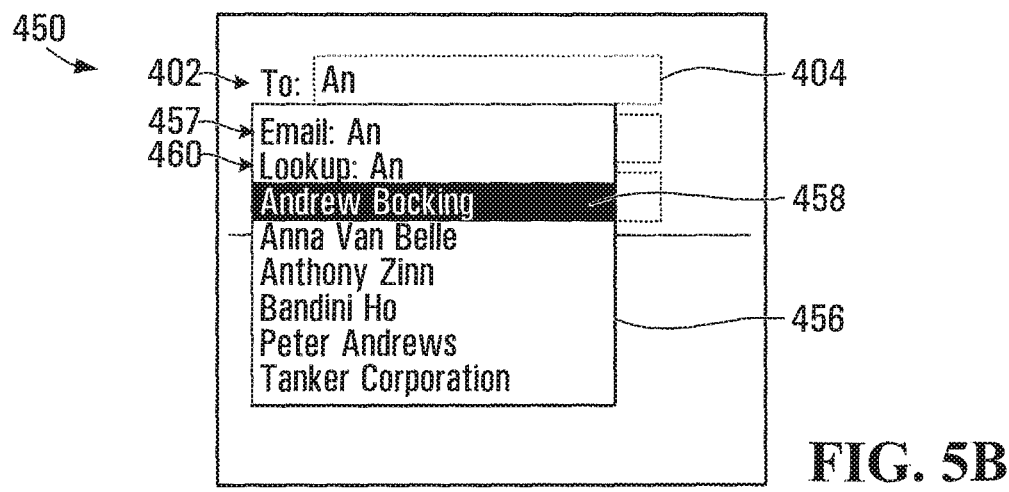

As the user types text in to field 404, any matching names may be selected from the address book and displayed in a selection menu 456 as shown in FIG. 5B. Matching names are sought from the name field and from the company field of entries in the address book, and optionally from other fields as well. (For reasons which will be explained, the menu 456 may be headed with the entries 'Email' and 'Lookup'.) The menu may allow a user to move down to one of the listed addresses and select an entry. Selection menu 456 is dynamically updated upon each keystroke entry of text into recipient field 404, by displaying in the selection menu 456 a filtered list of names, so that only names containing the typed text (in field 404) are displayed. As shown in FIG. 5B only names matching 'An' are listed in selection menu 456, as a result of the user typing 'An' into recipient field 404. Menu 456 may occupy as much vertical space below the field 404 as allowable. Moreover, the screen may scroll to allow at least two screens of menu 456.

As the user types in more letters the list of matching names may become shorter, since names that do not match the typed text are successively removed from selection menu 456 with each keystroke entry of text into field 404. If the user selects an entry in selection menu 456, the selected entry will be inserted into field 404, field 404 is changed to become a non-freeform field, and the selection menu 456 disappears. If the selected entry contains no email address, a warning is displayed indicating that the entry does not contain an email address. Conversely, if the selected entry contains multiple email addresses, a dialog or menu (not shown) is displayed with a list of possible email addresses for the recipient, to allow the user to select one.

In one embodiment, if an escape key is pressed, while the selection menu 456 has focus, the menu disappears and field 404 receives focus again. In alternate embodiments the user can close selection menu 456 by continuing to scroll up after the top item in selection menu 456 has received focus. In other embodiments, if a user changes a field (e.g. field 404) while menu 456 is not visible, either by keystroke or using the trackwheel, then menu 456 reappears.

Figure 5C:
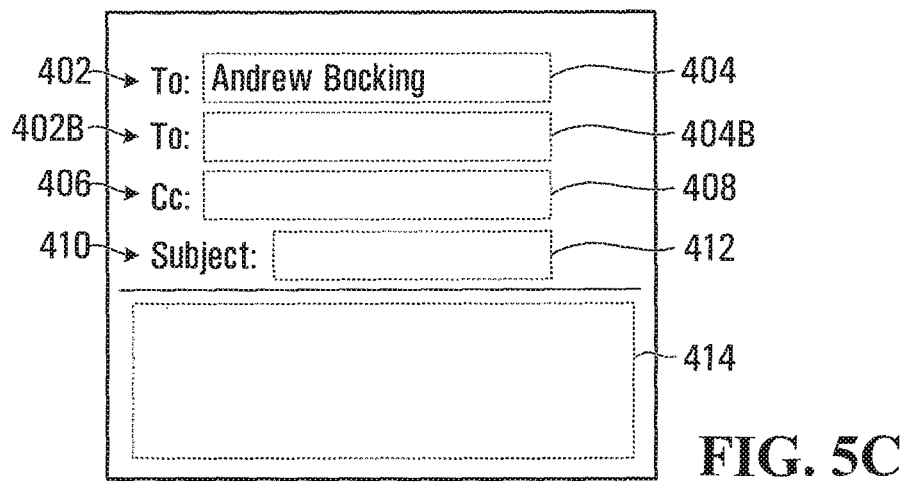

After an address is selected, and inserted into recipient field 404, a new input field of the same type ('To:', 'Cc:' or 'Bcc:') appears. For example, as shown in FIG. 5C, a new 'To:' label 402B and a second recipient field 404B appears after the initial 'To:' recipient field 404 was populated with the selected recipient. When the email is sent, all blank recipient fields are automatically stripped out. Conversely, a second recipient may then be provided in the new 'To:' field 404B, in a manner similar to the way of the first recipient is specified. The user may change the focus to any desired input field (e.g. from the recipient field 404B to the copy recipient field 408) using the trackwheel. At any time, the popup selection menu 470 of FIG. 5F may be invoked (by pressing the trackwheel) to select one of the entries labeled as 'Add To:' 474, 'Add Cc:' 476, 'Add Bcc:' 478 or 'Delete Field' 480. As the labels suggest, new input fields may be added: 'Add To:' entry 474 is used to add a new email recipient; the 'Add Cc:' entry 476 is used to add a copy email address; and the 'Add Bcc:' entry 478 is used to add a blind copy email address. To delete a field, either the delete key may be pressed or the popup menu 470 may be invoked while focus is on a given input field and the 'Delete Field' entry 480 selected to remove the unwanted input field.

Figure 5D:
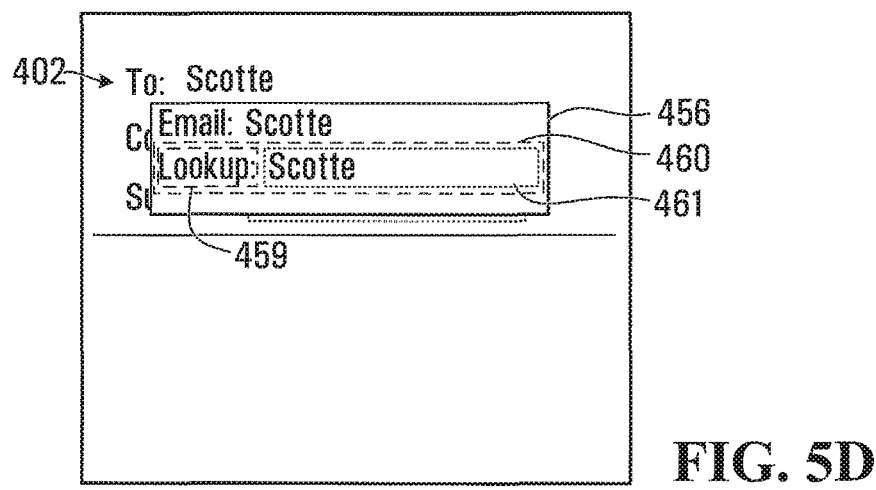

The possibility exists that the intended e-mail recipient is not in the address book but the user knows the e-mail address of the recipient. To facilitate entry of an e-mail address, as text characters are typed in recipient field 404 or 404B (FIG. 5C), the contents are translated in a special SMTP (simple mail transfer protocol) Email Translation Field 457 that appears at the top of the selection menu. This character translation works as follows. Letters and numbers remain unaltered. The first space character is translated into a '@' symbol and subsequent space characters are translated into periods. For instance the sequence of letters (inside the double quotes) "terry van belle" in this translation scheme, would be translated to 'terry@van.belle' (inside the single quotes) which results after replacing the first space by '@' and the subsequent space by a period, just as described above. As the first five letters, "terry" are entered, the SMTP email translation field 457 at the top of selection menu 456 would read "terry", while selection menu 456 also displays address book entries matching the string "terry", if any. As the first space character is typed in, the SMTP email translation field will now read 'terry@' in accordance with the translation scheme just described. After the second space character is entered (i.e., "terry van"), the SMTP email translation field would read 'terry@van.' and entries in menu 456 that do not match "terry van" would disappear, although the SMTP email translation field and the 'Lookup:' entry would still be visible (FIG. 5D). As the rest of the string characters are keyed in, the translated field would finally read 'terry@van.belle'. Alternatively, the translated text could appear in the recipient field 404, rather than in a separate SMTP translation field. The user may override the translation scheme in either of the following two ways. In the first way, after typing the first space character (such that the SMTP email translation field reads 'terry@'), the user may tap the backspace key to delete the space and then tap the space key again. The consequence in the SMTP email translation field is that the '@' symbol is deleted upon the pressing of the backspace key and a space, rather than a '@' symbol, is inserted upon the subsequent pressing of the space key. The same sequence may be used to delete subsequent periods in the SMTP email translation field. In the second way, the user may press the shift key along with the space key in order to force insertion of a space, rather than a translated character, in the SMTP email translation field.

Figure 5E:
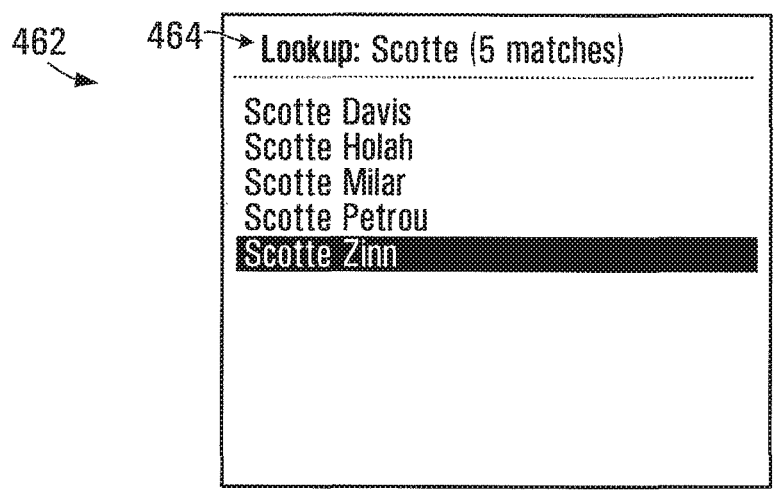
Figure 5F:
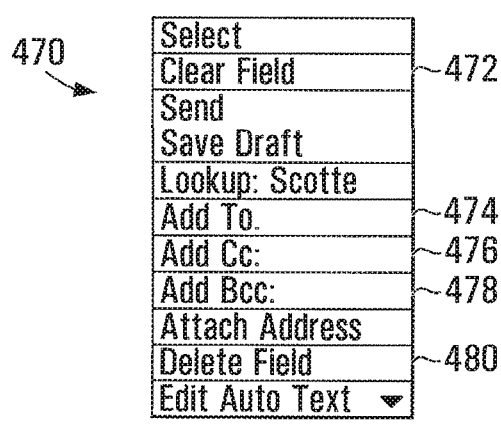

The email composition screen as shown in FIG. 5B and FIG. 5D may also allow a lookup in a global address list (GAL). The GAL is a list of recipients that resides in a remote computing device such as server 104 in FIG. 1. Thus, not all recipient email addresses need be stored in handheld device 200 as a GAL may be inspected by way of wired and/or wireless interconnections shown in FIG. 1. Specifically, the top of menu 456 includes 'Lookup:' entry 460 (FIG. 5D) with a label 459 and a field 461 mirroring the current contents of field 404 (except that occurrences of '@' and '.' in the text of field 404 are replaced with spaces). From the menu 456, a user selects the 'Lookup' entry 460 to search the GAL residing in a remote server. Thus, although all matching address book entries (i.e., locally stored recipient names) would be listed in menu 456 as the user types text into field 404, the user may select, 'Lookup:' entry 460, to trigger a global address lookup. The string in field 461 is then sent over network 110 to a server computer 106 using the communications subsystem 270 (FIG. 2), over network 110 as shown in FIG. 1. In server 106, recipients that match the received string are selected from the global address list and transmitted back to the device 200, where they are received, processed and presented to the user as shown in FIG. 5E. If the string is not found in the GAL, the list 462 should not appear but instead the field reads 'Lookup Failed: [keywords]', where [keywords] represents the contents of field 461.

An exemplary result of a remote or global address lookup is displayed in screenshot 462 in FIG. 5E. The title label 464 reads "Lookup: keywords (n matches)" or its equivalent, where n stands for the number of matches found in a remote address lookup. The title label thus indicates how many matches were found. If the search returns only one address, then in one embodiment, the returned address is automatically filled in to the appropriate recipient field without displaying screenshot 462. In one embodiment, the lookup screen 462 is not automatically displayed. Instead the input field reads 'Lookup: keywords (n matches)'. If the menu 456 is invoked while focus is in such a field, the menu contains a 'View Lookup' entry. Selecting 'View Lookup' then invokes screenshot 462. Once an entry is selected, screenshot 462 disappears and the email composition screen appears.

Figure 6:
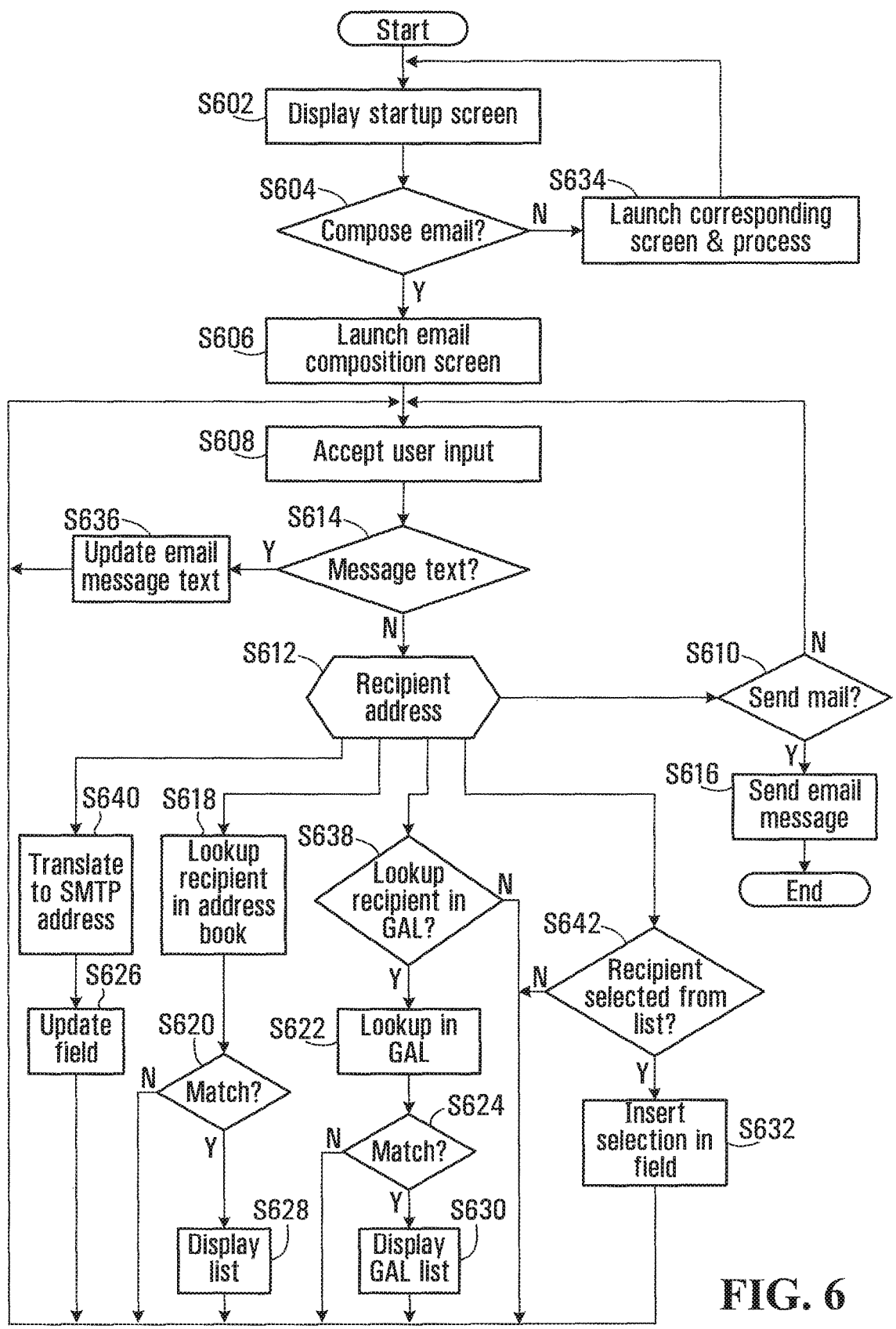
FIG. 6 is a flowchart that illustrates one exemplary operation of a handheld device executing an email client in accordance with an exemplary embodiment.

FIG. 6 shows a flow chart that summarizes the basic operations of one possible implementation of a handheld device executing an email client as presently disclosed. The flow chart S600 starts by displaying a startup screen which may be similar to the screenshot shown in FIG. 3A (S602). If the user decides to compose an email message (S604), the device launches an email composition screen (S606), and waits for a user input (S608). If the input is message text (S614) then the email message field is updated (S636) and the process returns to waiting for user input (S608). If the input is an indication to send the composed email (S610) the email is sent to the specified recipients (S616). If the input is a recipient address (S612) then several processes take place. The text in the recipient field is translated into an SMTP address (S640) and the corresponding field is updated (S626). Moreover, as soon as the recipient is partially specified, the partial text is used to search the address book for matches (S618, S620), which are displayed (S628). If the user elects to search the GAL (S638) using the 'Lookup' option, then the partial text is also searched in the GAL (S622). Matching recipients from the GAL (S624) are displayed to user (S630). If the user chooses a recipient from the displayed list of matching recipients (S642), then the chosen recipient is inserted into the appropriate input field (S632). As can be seen, control may be returned back to the user (to S608) from several steps (S636, S626, S620, S628, S624, S632, etc.) to permit flexible user interaction.

A detailed, step-by-step, example of using one embodiment of a user interface for composing and sending an email message is described below with reference to FIGS. 7 to 29.

Figure 7:
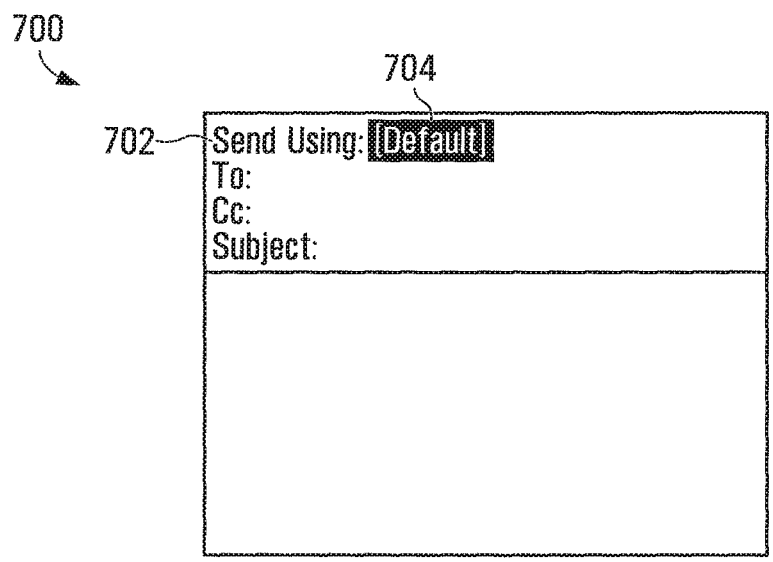
FIGS. 7-29 are block diagrams representative of various screens of a user interface encountered by a user when executing email client software in an exemplary embodiment of the handheld device of FIG. 2.

Turning to FIG. 7, a block diagram of an empty email composition screen 700 is depicted. Screen 700 is similar to the screenshot depicted in FIG. 5A but additionally shows a 'Send Using' label 702 and associated 'Send Using' field 704. By default, when a new e-mail composition screen is opened, as shown, the 'Send Using' field may be set to the option of 'Default'.

Figure 8:
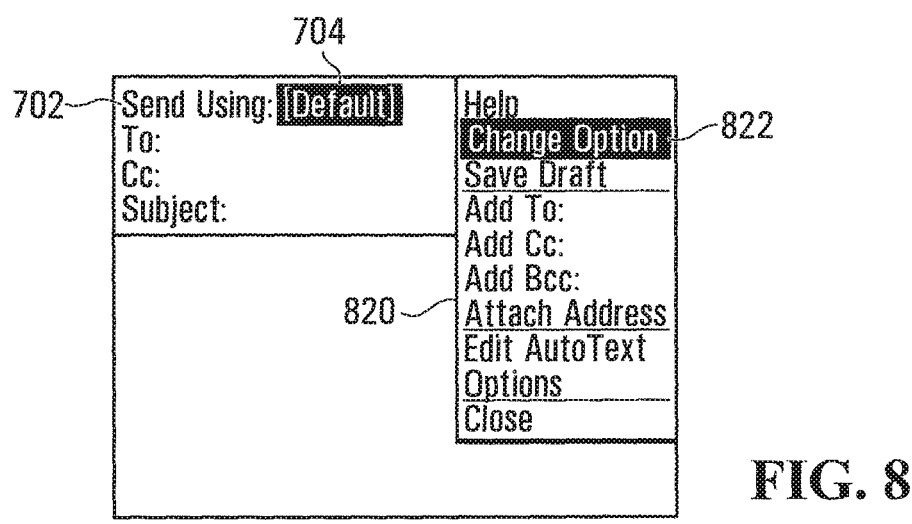
Figure 9:
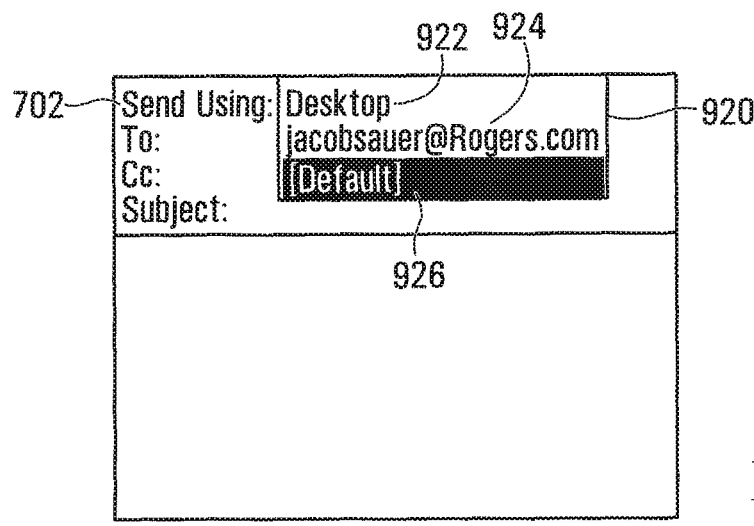

While focus is on the 'Send Using' field, the user may press trackwheel 206 on obtain pop-up menu 820 (FIG. 8). The user may then select the 'Change Option' entry 822 in pop-up menu 820. This results in the pop-up of a selection menu 920 as shown in FIG. 9 which lists possible services to use in order to send the email message. In this way, the user may select which email service to use and, in consequence, the contents of the 'From:' field in the e-mail message which is sent. As shown, the user has the option of choosing an enterprise service labeled 'Desktop' 922 or another internet service, Rogers, which is labeled with the actual address 924 which will appear in the 'From' field of the e-mail message if this service is chosen. The default entry 926 in menu 920 is associated with one of the listed services (i.e., one of the services indicated by labels 922 and 924). The user may separately set which service is to be considered the default service so that the user will know which service he is using when the default service is selected.

Figure 10:
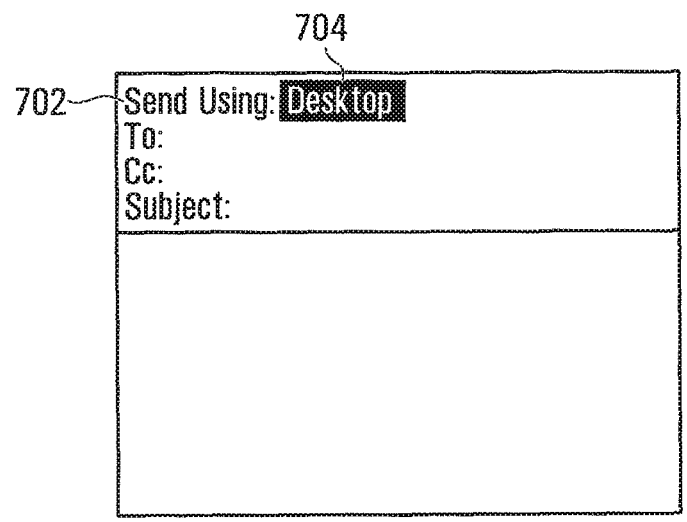

For example, if a user changes the option to the 'Desktop' entry (representing the enterprise email service) then, as shown in FIG. 10, 'Desktop' is thereafter displayed in the 'Send Using' field 704.

Figure 11:
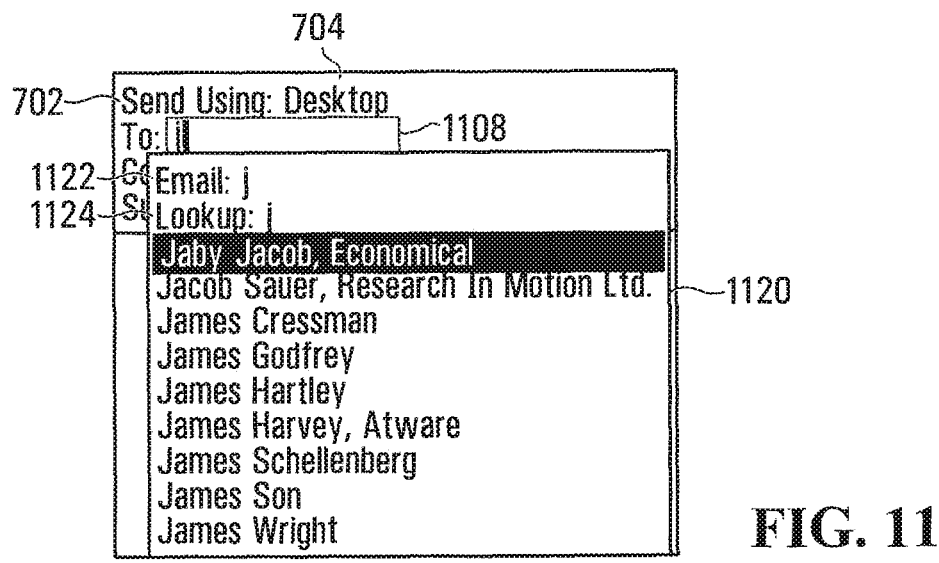

FIG. 11 depicts the selection of an email recipient in the recipient field 1108. The user may type text into recipient ("To:") field 1108 whereupon the microprocessor 228 (FIG. 2) accesses the address book in local memory to find any matching names. These matching names are displayed in selection menu 1120, as shown in FIG. 11. Menu 1120 is headed with fields 1122, 1124 labeled 'Email' and 'Lookup', respectively. A user can move an indicator down menu 1120 (using the trackwheel) to focus on one of the listed addresses and select such entry. Further, the user may scroll down menu 1120 using trackwheel 206 to see additional entries, if there are more entries than can be displayed at once. The menu 1120 may contain all matching entries, or the menu may be capped at a pre-determined number of entries.

Selection menu 1120 is dynamically updated upon each keystroke entry of text into recipient field 1008, by displaying in the selection menu 1120 a filtered list of names containing the typed text. Thus, in FIG. 11, all names containing a 'j' are listed in selection menu 1120, as a result of the user typing 'j' into the recipient field 1008. As the user adds more text into the recipient field 1008, a smaller subset of names is shown in the menu. Accordingly in FIG. 12, only names matching the text 'jaco' are listed in menu 1220.

Figure 12:
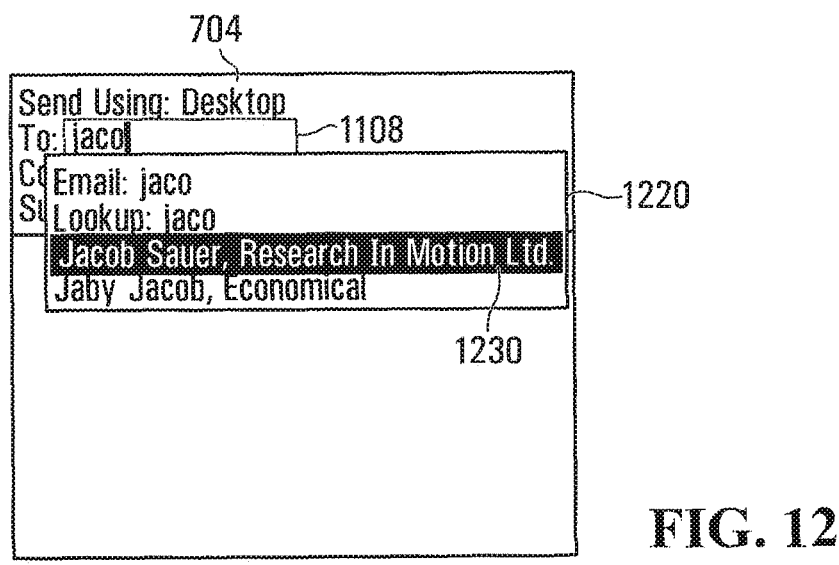
Figure 13:
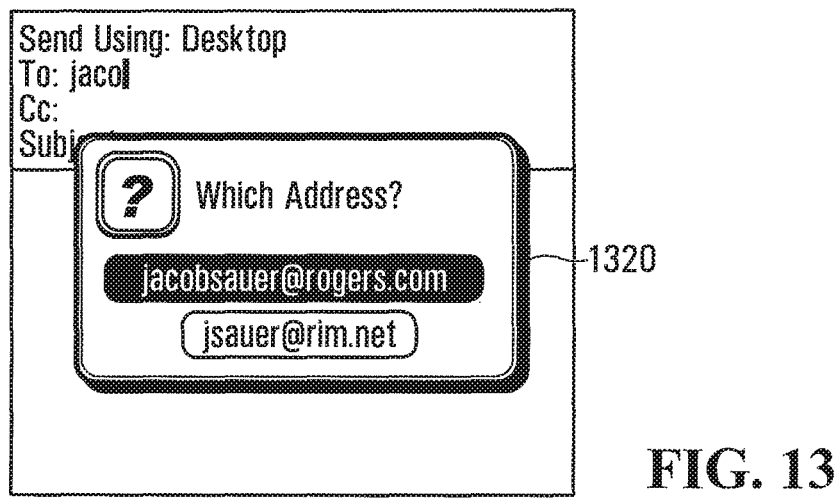
Figure 14:
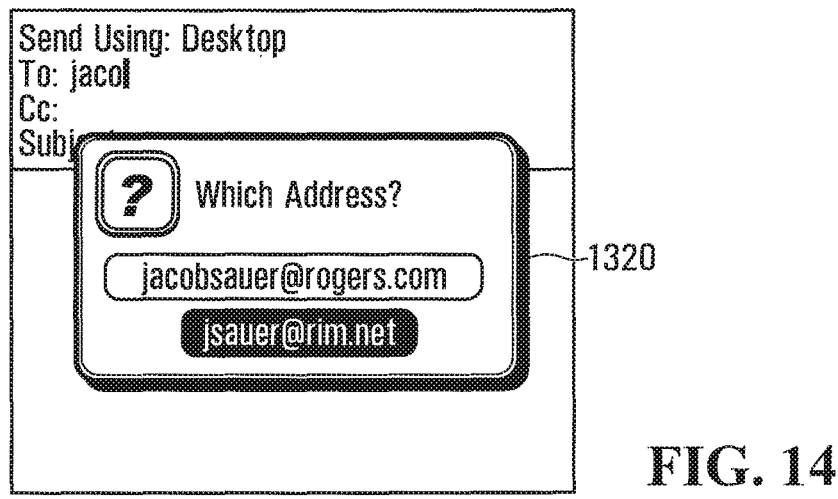

If the user focuses on the recipient represented by entry 1230 in menu 1220, as shown in FIG. 12, and selects this recipient, since this selected recipient has more than one email address in the address book, as seen in FIG. 13, another pop-up menu 1320 is displayed to facilitate selection of the email address to use. Specifically, menu 1320 lists all email addresses in the address book that are associated with the selected recipient. The user highlights and selects one of the email addresses using trackwheel 206 (as shown in FIG. 14, the address jsauer@rim.net).

Figure 15:
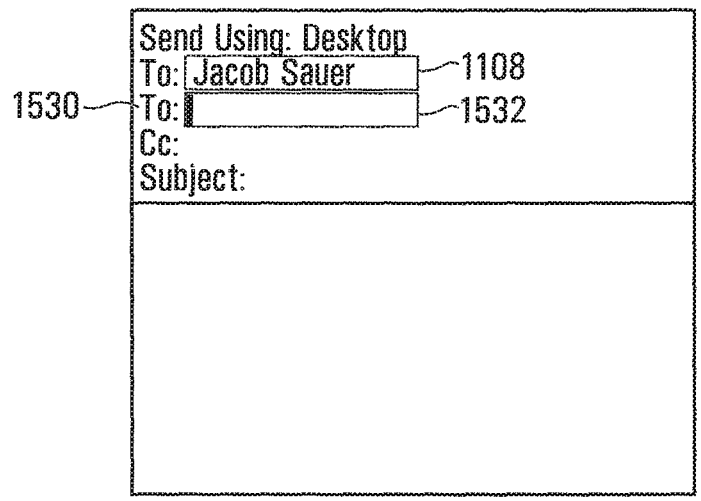

Upon the user selecting a particular email address, as seen in FIG. 15, the selected recipient is displayed in recipient field 1008 and the selected email address is internally stored for use when actually sending the completed email message. Notably, if the user had not changed the email service indicated by the 'Send Using' field from its initial 'Default' setting, upon selection of the recipient, the 'Default' indicator in this field is replaced with the label for the actual service which is associated with the 'Default' indicator (for example, the 'Desktop' label). Moreover, upon selection of a recipient's email address, a new "To:" label 1530 and an associated recipient field 1532 are displayed to facilitate accepting an additional email recipient.

Figure 16:
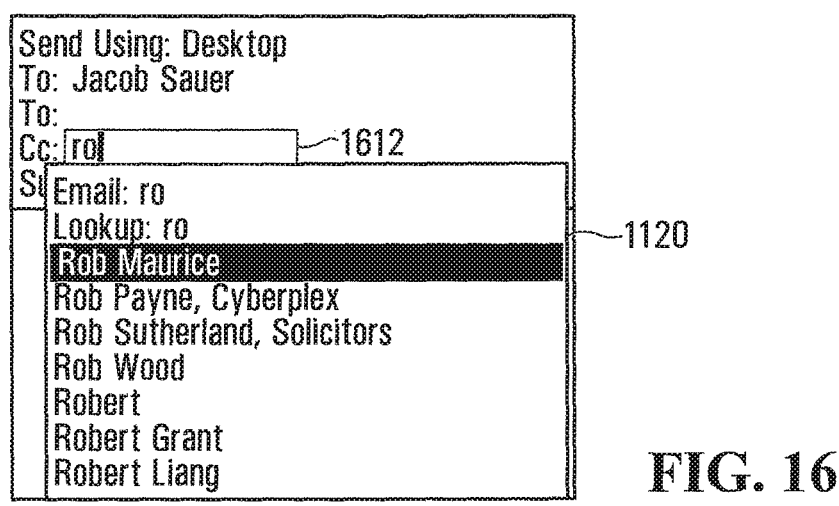
Figure 17:
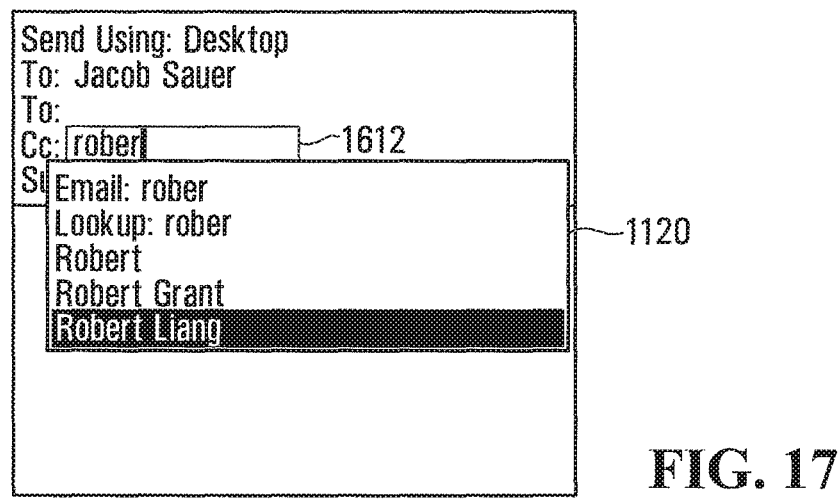
Figure 18:
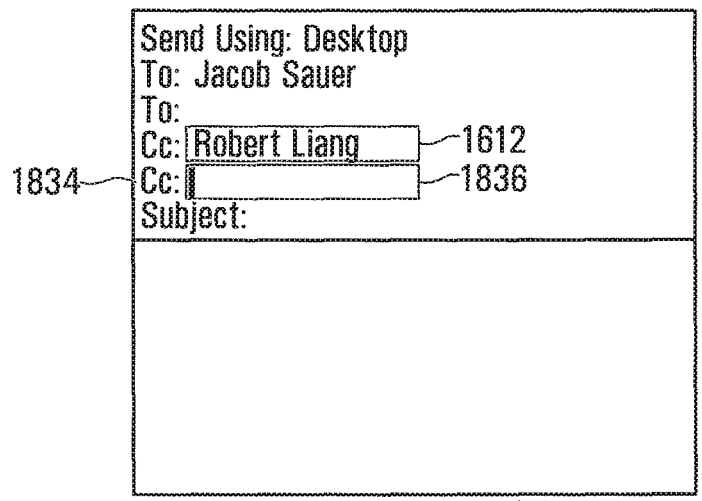

FIG. 16 depicts the selection of a carbon copy (Cc) email recipient in a Cc recipient field 1612. This works in the same manner as the described manner of specifying an email recipient in the recipient field 1108 of FIG. 11. As the user types text into field 1612, matching names are selected from the address book by microprocessor 228 (FIG. 2) and displayed in a selection menu 1120. Menu 1120 is headed with the entries 'Email' and 'Lookup', providing fields for use as described hereinbefore. A user can move an indicator down menu 1120 to focus on one of the listed addresses and select an entry. Further, as noted above, the user may scroll down menu 1120 using trackwheel 206 to see additional entries, if there are more entries than can be displayed at once. The menu 1120 may contain all matching entries, or the menu may be restricted to display a pre-determined maximum number of entries. Thus, as the user types more text into the Cc recipient field 1612, the list of names in menu 1120 is filtered to include only those matching the typed text. As shown in FIG. 17, menu 1120 only lists names matching the text 'rober' consequent upon the text 'rober' being entered into the Cc recipient field 1612. As shown in FIG. 17, the user has focused on the entry "Robert Liang" in menu 1120. If this recipient is selected then, as illustrated in FIG. 18, the recipient Cc field 1612 is populated with this recipient. Furthermore, consequent upon selecting a Cc recipient, a new Cc recipient field 1836 is added along with a corresponding label 1834, as depicted in FIG. 18. If the selected recipient had more than one email address in the address book, a pop-up menu (similar to menu 1320 of FIG. 13) is first displayed to allow selection of the email address to use.

Figure 19:
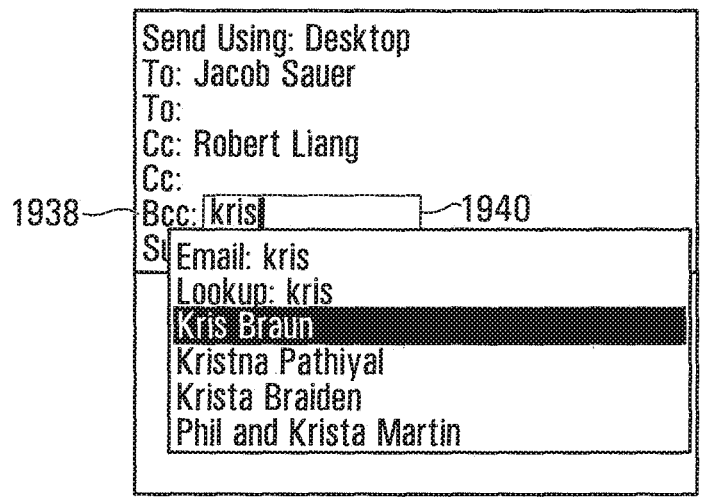

Trackwheel 206 may be used to invoke pop-up menu 820 (FIG. 8) in order to select the addition of a blind carbon copy (by selecting the "Add Bcc" entry of the menu). Upon such selection, as seen in FIG. 19, a 'Bcc' label 1938 and an associated field 1940 are added to the composition screen. The specification of a Bcc recipient in field 1940 proceeds in the same manner to the above described procedure specifying the Cc recipient in field 1612 (FIG. 16). Specifically, as shown in FIG. 19, once the user has typed "kris" into the Bcc recipient field 1940, the menu of matching names will be filtered to include only address book entries matching this text string.

Figure 20:
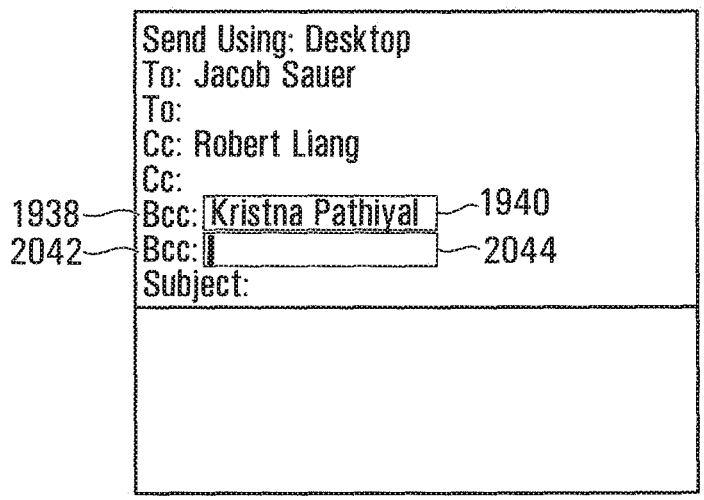

Upon selection of a Bcc recipient—as shown in FIG. 20, the recipient "Krishna Pathiyal"—this recipient is displayed in Bcc recipient field 1940 and a new Bcc recipient field 2044 is added along with a corresponding label 2042. The new field may be populated as described above, or ignored by the user.

Figure 21:
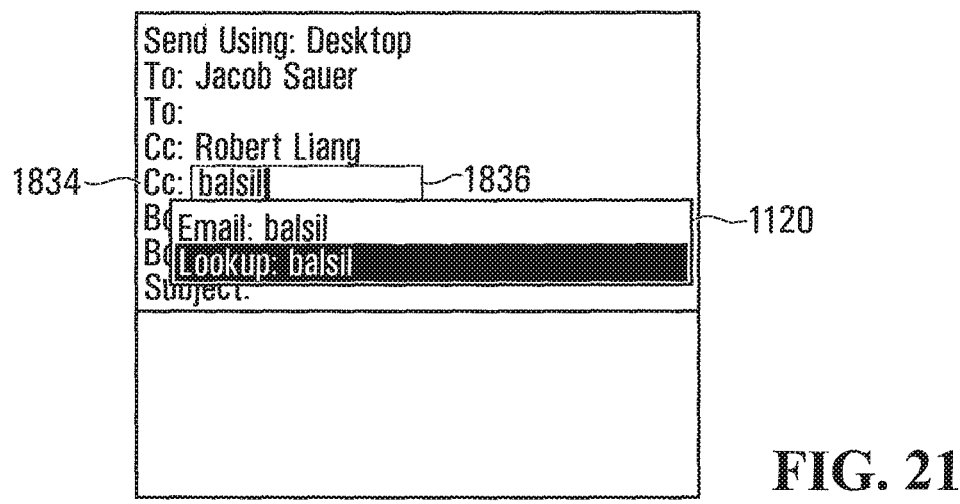
Figure 22:
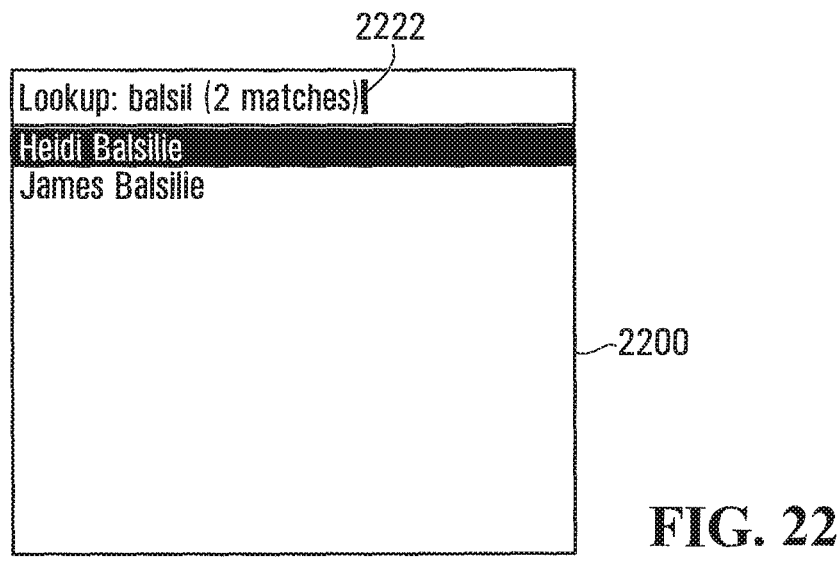
Figure 23:
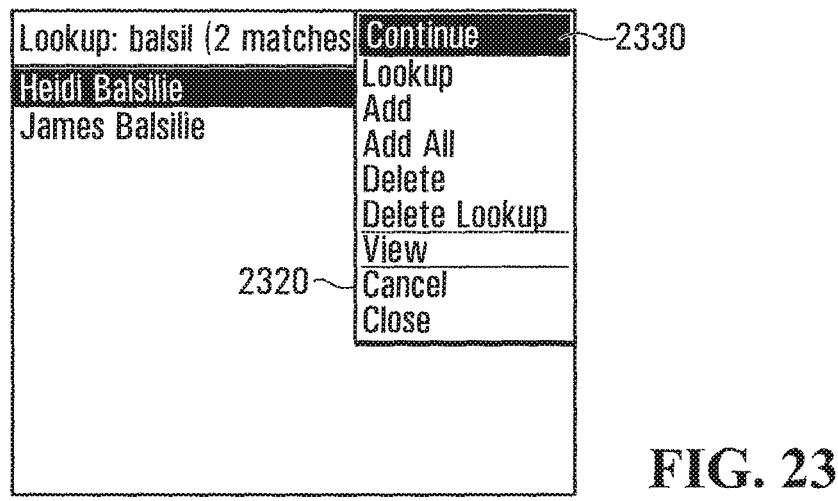
Figure 24:
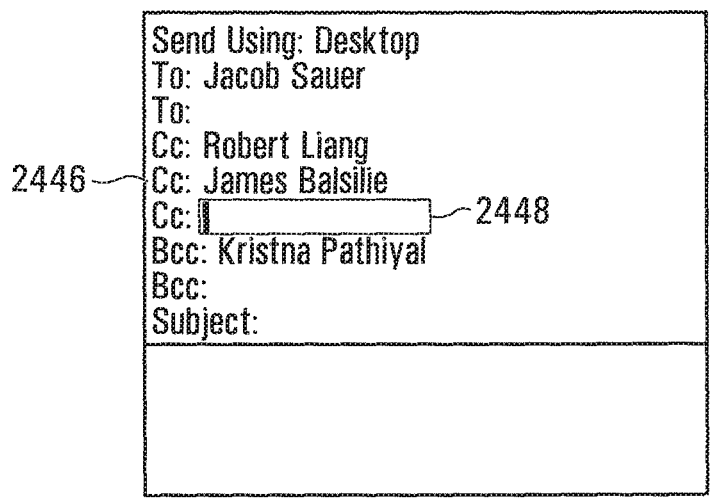

If the intended recipient is not in the address book, as depicted in FIG. 21, selection menu 1120 may only include the 'Email' and 'Lookup' entries. As shown in FIG. 21, this has resulted from the user populating the second Cc recipient field 1836 with the text "balsil". Further, this figure shows the user has focused on the 'Lookup' entry on selection menu 1120. If the user selects this entry to lookup or inspect a global address list that resides in a corporate mail server accessible via corporate mail service, the microprocessor 228 (FIG. 2) is prompted to query the corporate mail server 104 (FIG. 1) at which the global address list resides. Matching names retrieved from the global address list are displayed, as shown in FIG. 22 in menu 2200. Menu 2200 may be headed with an indication of how many matches were found. Thus, in FIG. 22, the heading text 2222 "Lookup: balsil (2 matches)" indicates that two matches were found in the global address list. The user may then select a desired recipient by focusing an indicator on this recipient and pressing the enter key from keyboard 224 (FIG. 2) or using trackwheel 206 to bring up a pop-up menu 2320 (FIG. 23) and select the 'Continue' option 2330. Upon selection of a recipient, the recipient name populates the second Cc recipient field and a new, third, Cc recipient field 2448 with an associated "Cc:" label 2446, is then added to the composition screen as shown in FIG. 24.

Figure 25:
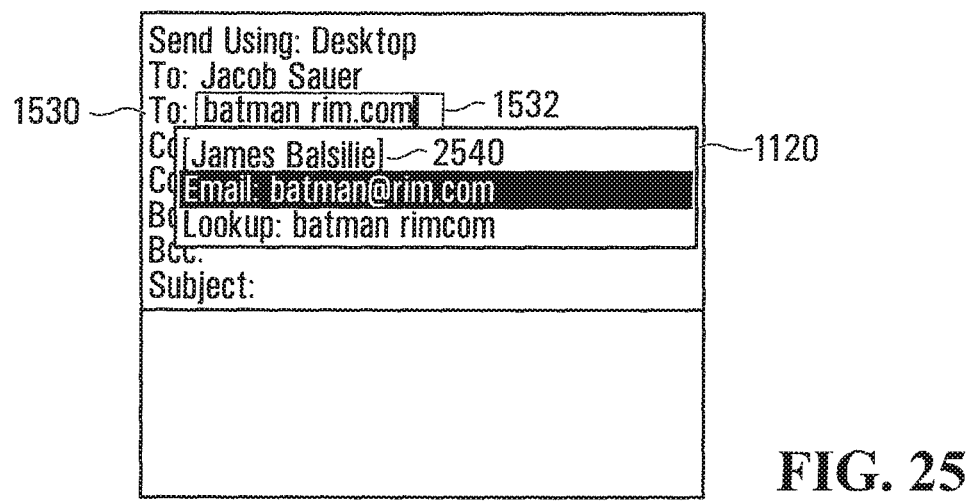

The user may also enter the recipient address directly into the recipient field (which is useful if the recipient address is neither in the address book nor in the global address list). For example, if the user wants to send an email to batman@rimcom, the user can type "batman@rimcom" or "batman rim com" into the second recipient field 1532 (FIG. 25). In the latter case, as noted earlier, a character translation is used in which letters and numbers remain unaltered while the first space character is translated into the '@' symbol and subsequent space characters are translated into periods. Further, once the user has looked up a text string in the global address list—in the present example the string "balsil"—and selected one of the returned names, the selected name and associated e-mail address is cached locally and will appear in each future appearance of selection menu 1120. For this reason, name specific look-up field 2540 appears at the head of selection menu 1120 in FIG. 25. This has the advantageous result that an entry not in the local address book but previously obtained from the global address list (here [James Balsillie]) can be added to an e-mail message without inspecting the global address list again. Cached address entries may be retained until the entry is added to the local address book or deleted.

Figure 26:
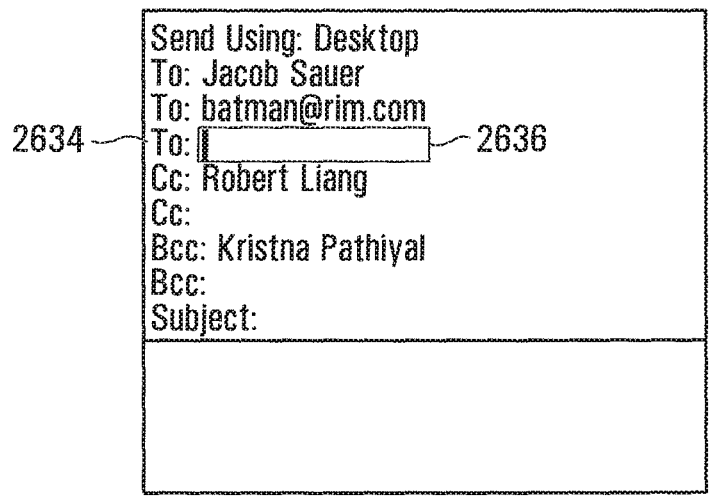

Once the recipient is specified in the second recipient field 1532, a third recipient field 2636 and associated label 2634 are added to the email composition screen as shown in FIG. 26. In general, a new recipient field with an associated label are added to the email composition screen after a recipient has been selected and filled into the last available recipient field. This new field is of the same type as the most recently populated recipient field. Thus, if the most recently populated field is a 'To:' field, a new 'To:' field (and associated label) is added; if the most recently populated field is a 'Cc:' field, a new 'Cc:' field (and associated label) is added; and if the most recently populated field is a 'Bcc:' field, a new 'Bcc:' field (and associated label) is added.

Figure 27:
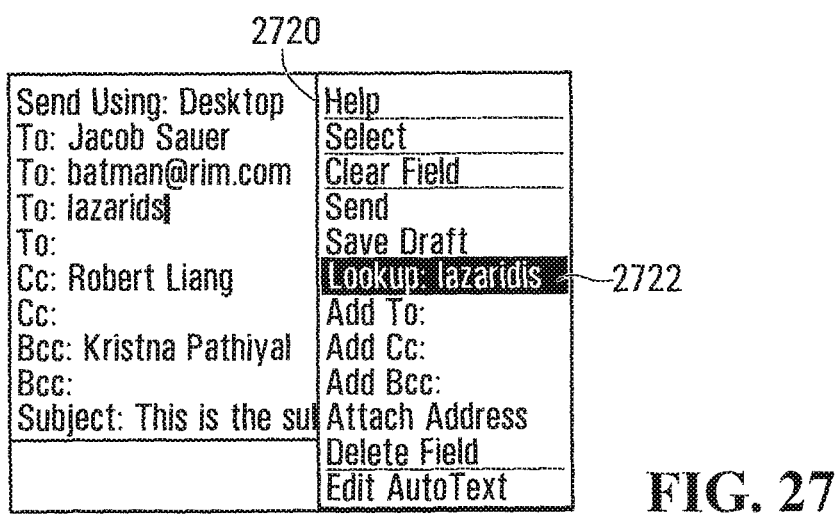
Figure 28:
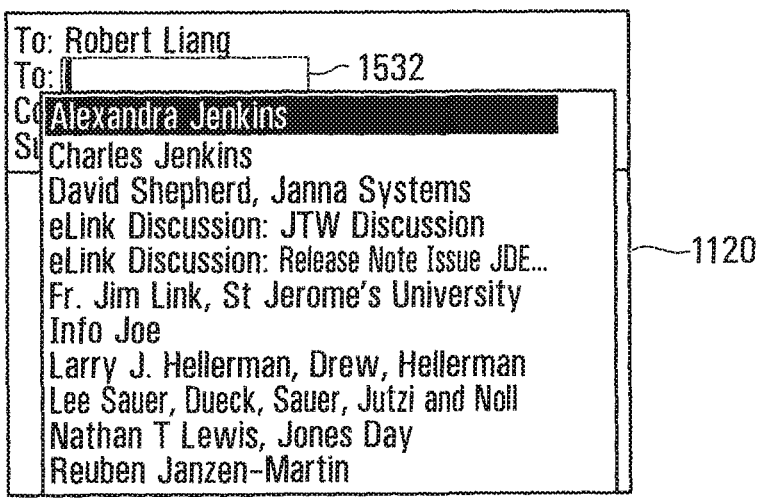

It may be that a user, after typing a text string into one of the recipient fields, such as "lazaridis", inadvertently selects the option "Email lazaridis" from the selection menu 1620 (FIG. 16). In consequence, the name "lazaridis": will appear in the "To:" field. In this case, the user may scroll to this "To:" field and click the trackwheel 206 to obtain a context specific pop-up menu 2720 (FIG. 27). This menu 2720 will include an entry 2722 "Lookup: lazaridis", the selection of which will cause the microprocessor 228 to retrieve matching names from the global address list and display these.

The process of matching the typed text in a recipient field to entries in the address book is done by comparing the typed text to both the name of a recipient in an address book entry and also other attributes in the address book entry such as company names. Accordingly, with reference to FIG. 28, when "j" is typed into the recipient field 1532, then recipient "David Shepherd, Janna Systems" is listed in selection menu 1120, although the letter "j" does not appear anywhere in the name "David Shepherd": The match is due to the company name "Janna Systems" associated with recipient "David Shepherd".

Figure 29:
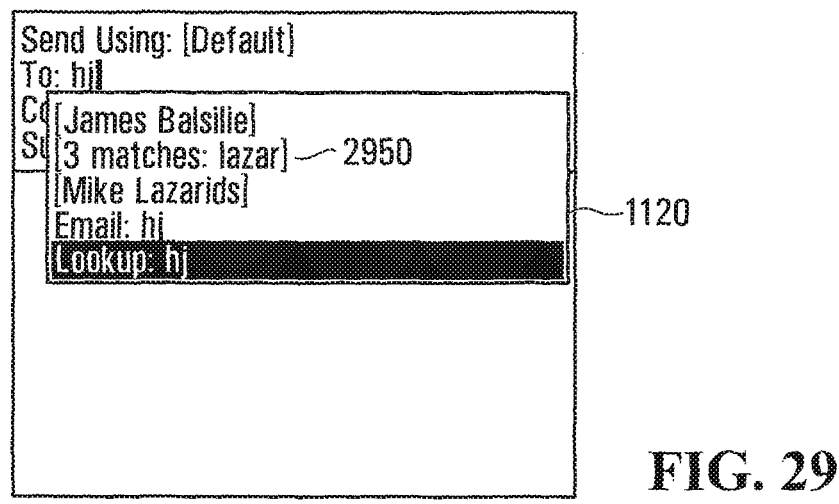

In an alternate embodiment illustrated in FIG. 29, the selection menu 1120 lists not only recipients previously looked up and selected from the global address list but also the results of look-up searches of the global address list, such as search 2950.

The described approach and user interfaces may also be used with messaging services other than e-mail such as a Personal Identification Number (PIN) based addressing service, a short messaging service (SMS), a multimedia messaging service (MMS) or an instant messaging (IM) service. Where handheld device 200 may operate using one or more of these services, the user may select a particular service to use.

For example, a handheld device 200 may have a personal identification number (PIN) associated with it and a service may exist to allow addressing messages with a PIN. When two such devices communicate using a PIN-based addressing service, one device may send a message using a recipient's PIN (instead of an email address). Using handheld device 200 operating according to an embodiment of the present disclosure, a user may arrive at a screen similar to screenshot 400 (FIG. 5A) by selecting the 'Messages' icon (FIG. 3A), invoking a popup selection menu (not shown), and selecting a 'Compose PIN' entry. The handheld device may now be said to be in 'PIN mode'. As described for email composition, when a user types in text to an input field such as field 404, matching name entries from the address book appear in a selection menu such as selection menu 456. After the user selects a name, the selected entry is displayed in the input field. If the selected recipient in selection menu does not have a PIN address, a message indicating this may be displayed to the user. It is also possible that the intended recipient is not in the address book but the user knows the PIN of the recipient. To facilitate entry of the PIN, as text characters are entered, the client software may perform validation of the characters entered into a PIN input field and eliminate invalid PIN characters. For example, valid PIN characters in one embodiment may only include numeric characters 0-9 and letters a-f and A-F.

A step-by-step, example of using one embodiment of the user interface for composing and sending a PIN message is described below with reference to FIGS. 30 to 33.

Figure 30:
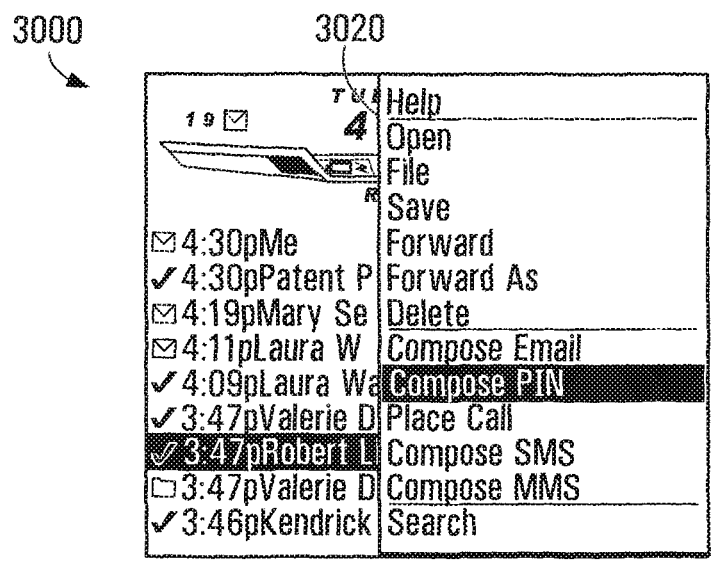
FIGS. 30-33 are block diagrams representative of various screens of a user interface encountered by a user when composing a Personal Identification Number (PIN) based message using the handheld device of FIG. 2.

FIG. 30 depicts a message screen 3000 that is typically arrived at, for example, by pressing the 'Messages' icon in the start up screen 300 (FIG. 3A). While on message screen 3000, the user can invoke a pop-up menu 3020 while a particular message is highlighted. Pop-up menu 3020 includes an entry "Compose PIN" that can be selected to invoke a PIN composition window.

Figure 31:
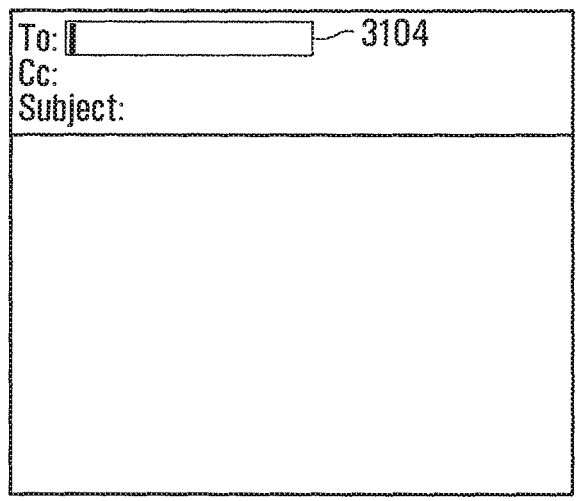
Figure 32:
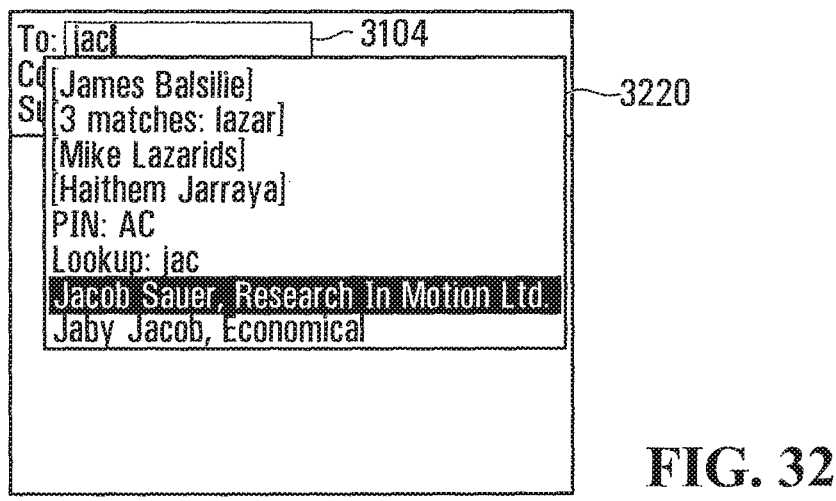

An exemplary PIN composition window is shown in FIG. 31. The PIN composition window is similar to the email composition window of FIG. 7 but does not include the 'Send Using' field and label. The user can type text into recipient ("To:") field 3104 whereupon the microprocessor 228 (FIG. 2) accesses the address book in local memory to find any matching names. These matching names are displayed in a selection menu 3220, as shown in FIG. 32. The user can move an indicator down menu 3220 to focus on one of the listed addresses and select a recipient. If the number of entries is too numerous to show on the display, the user may also scroll down menu 3220 using trackwheel 206 to see additional entries. Menu 3220 may contain all matching entries, or the menu may be capped at a pre-determined number of entries.

Selection menu 3220 is dynamically updated upon each keystroke entry of text into PIN recipient field 3104, by displaying in the selection menu 3220 a filtered list of names containing the typed text. Thus, as a result of the user typing 'jac' into the recipient field 3104 in FIG. 32, only names containing the text 'jac' are listed in selection menu 3220. Additionally, as illustrated, the results of earlier global address list searches are shown.

Figure 33:
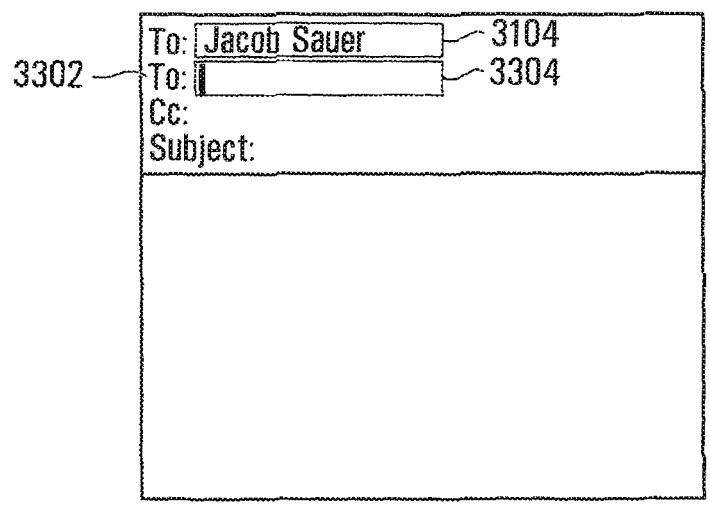

As is the case with other input fields discussed above, upon selection of a PIN recipient as shown in FIG. 33, the recipient is displayed in PIN recipient field 3104 and a new PIN recipient field 3304 is added along with a corresponding label 3302. The new field may be populated in the manner described above, or ignored by the user. If the selected recipient did not have an associated PIN address, a warning to the user is generated.

In an alternate embodiment, keyboard 214 (FIG. 2) may be a "reduced keyboard" in which multiple letters, symbols, and/or digits, and the like, are assigned to any given key. For example, in U.S. Pat. No. 7,091,885 to Fux et al., the contents of which are incorporated herein by reference, multiple letters arrayed in a QWERTY arrangement are represented by a single key. Thus, the upper left key represents the letters 'q' and 'w', the next key, the letters 'e' and 'r', and so on. Other known reduced keyboards have included other arrangements of keys, letters, symbols, digits, and the like. Since a single actuation of such a key potentially could be intended by the user to refer to any of the represented letters, the input generally is an ambiguous input and is in need of some type of disambiguation in order to be useful for text entry purposes.

To enable a user to make use of the multiple letters, digits, and the like on any given key, various keystroke interpretation systems have been provided. For instance, a "multitap" system allows a user to substantially unambiguously specify a particular character on a key by pressing the same key a number of times equivalent to the position of the desired character on the key.

In another keystroke interpretation system, a user presses keys to which the desired characters, amongst others, have been assigned, generally pressing each key one time for each desired letter, and disambiguation software attempts to predict the intended input.

Accordingly, in one embodiment, multiple characters appear on each key of the keyboard of the handheld and the user interface software includes disambiguation software that predicts the intended input of the user from a potentially ambiguous input. A step-by-step example of email composition using one embodiment employing a disambiguation engine is depicted in FIGS. 34-36.

Figure 34:
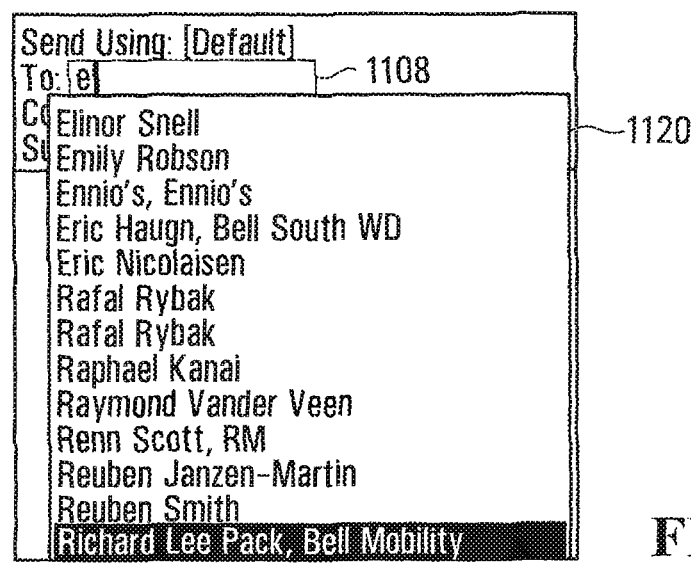
FIGS. 34-36 are block diagrams of various screens of a user interface encountered by a user when composing an email message using a handheld device employing a disambiguation engine.

In FIG. 34, to enter text to the recipient filed 1108 of an empty e-mail composition screen, the user presses a key representative of the letters 'e' and 'r'. This results in the first of these letters (i.e., the letter 'e') being displayed in the recipient field and in the appearance of selection menu 1120 populated with address book names containing either the letter 'e' or the letter 'r'.

Figure 35:
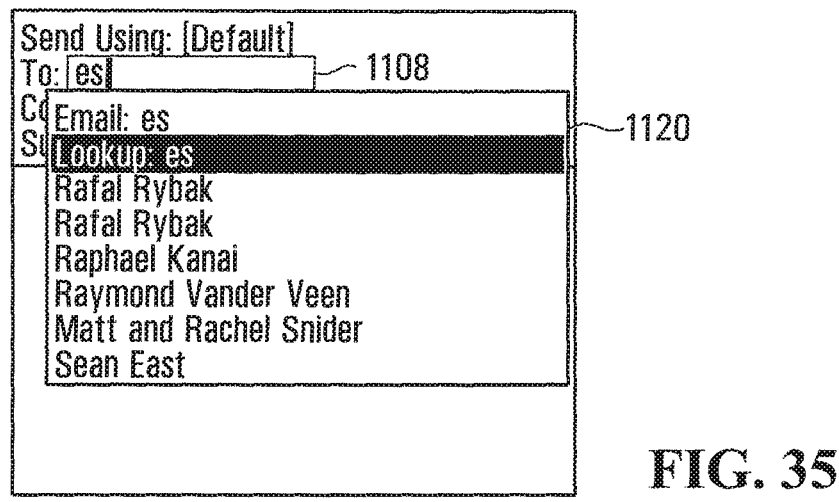

In FIG. 35, the user inputs an additional ambiguous letter into recipient field 1108 by pressing a key which signifies both the letters 'a' and 's'. In this instance, the recipient field displays the letter 's' as this is considered the more likely letter to follow the supposed initial 'e'. Selection menu 1120 is also updated to display all address book entries that contain 'ra', 'ea', 'es', or 'rs'. In other words, all address book entries that may match all possible interpretations of the input text are displayed.

Figure 36:
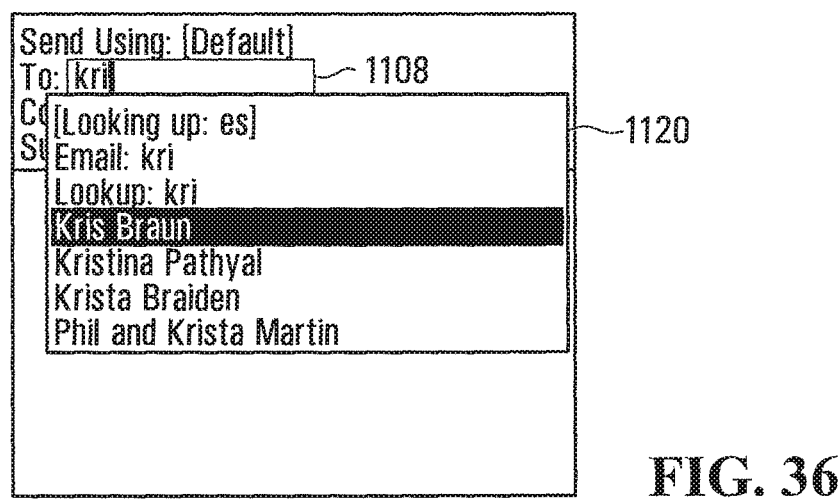

FIG. 36 shows the possibility of the user inputting the three letter ambiguous text "kri" into recipient field 1108 by first pressing a key which may signify the letter 'j' or the letter 'k' followed by pressing a key which may signify the letter 'r' or the letter 'e' and then by pressing a key which may signify the letter 'u' or the letter 'i'. If, of all the eight possible combinations, the local address book has entries matching only the "kri" combination, this is the combination which is displayed in the recipient field and which is used to obtain selection menu 1120. As is typical with disambiguation engines, a drop down menu is available to allow the user to edit the automatically selected text.

In another embodiment, short messaging service (SMS) may be used to send a text message to a recipient. Here, instead of an email address or a PIN, a phone number is used to specify recipients. A phone number associated with an SMS-enabled device may be specified as a recipient directly or through selection of a name in the address book associated with a phone number. Again, using handheld device 200, a user may arrive at an SMS composition screen by selecting the 'Messages' icon (FIG. 3A), invoking a popup selection menu (not shown), and selecting a 'Compose SMS' entry. Of course, in an SMS composition screen, only the 'To:' label and corresponding field is displayed, since 'Cc:' and 'Bcc:' labels or associated input fields are not supported by SMS. If the intended recipient is not in the address book, or no phone number is associated with the recipient, but the user knows the phone number of the recipient, the user may enter the phone number into the input field. As the user keys in a phone number, the client software may assist the user by performing validation as characters are entered into a phone number input field and eliminating invalid characters. For example, valid phone number characters in one embodiment include only numeric characters 0-9.

In yet another embodiment, multimedia messaging service (MMS) may be used to send a text message and multimedia attachments to a recipient. Here, either a phone number or an email address is used to specify recipients. A phone number associated with an MMS-enabled device may be specified as a recipient. Using handheld device 200 a user may arrive at an MMS composition screen by selecting the 'Messages' icon (FIG. 3A), invoking a popup selection menu (not shown), and selecting a 'Compose MMS' entry. As is the case for SMS, in an MMS composition screen, only the 'To:' label and corresponding field are displayed, since 'Cc:' and 'Bcc:' labels or associated input fields are not supported by MMS. If the intended recipient is not in the address book the user may enter the phone number of the recipient directly into the input field. The client software may assist the user by performing validation as characters are entered into a phone number input field, and eliminating invalid characters. Similar to the case for SMS, valid phone number characters in one embodiment are restricted to numeric characters 0-9.

In yet another embodiment, instant messaging (IM) may be used to send and receive text messages to a recipient in real time. Here, a buddy name is used to specify recipients and a buddy name from a contact list associated with an instant messaging service is used to select a recipient. Using an instant messaging client on handheld device 200 a user arrives at an instant messaging screen. Instant messaging requires the user to log into an IM server. Once logged in, the user may initiate two-way communication with another user (a buddy) who is also logged in to the IM server. Similar to what was described for email composition, when a user types in text to the input field, matching buddy name entries from the list of contacts that are online (buddy names), may appear in a selection menu similar to selection menu 456 allowing the user to select one. After the user selects a name, the selected entry is displayed in a field, such as field 404, and the user may then send and receive messages in real time. Rather than selecting a name from a contact list (buddy list), the user has the option of keying in a known buddy name.

In alternate implementations of instant messaging, a buddy name may be associated with address book entries. Using an instant messaging client on handheld device 200 a user may arrive at an instant messaging screen. As described for email composition, when a user types in text to the input field 404, matching recipient names from the address book are displayed in selection menu 456 allowing the user to select one. After the user selects a name, the selected entry may be displayed in a field, such as field 404, and the user may send and receive messages in real time. However, if the selected entry does not have an associated buddy name, the user is warned. Once again, the user may have the option of keying in a known buddy name into a recipient input field.

As may be appreciated by an ordinary user of popular desktop applications, the layout of screenshot 400 shown in FIG. 5A is substantially the same as user interface layouts commonly used in popular desktop email clients. In particular, field 404 corresponding to label 402 (which reads "To:") and field 408 corresponding to label 406 (which reads "Cc:"), are now very intuitive to use, even for novice users working with a handheld device with no address book entries. Users may now simply type the address of the recipient in to the field 404 (or field 408) without first going through menu driven input sequences such as the dropdown list similar to 338 (in FIG. 3B). As a further advantage, the often confusing '[Use Once]' selection 336 (shown in FIG. 3B) is conveniently avoided altogether. The improved user interface thus allows for a more enjoyable user experience and a reduced learning curve for new users, which in turn may help drive demand for wireless communication devices and related services.

Of course, the above described embodiments are intended to be illustrative only and in no way limiting. The described embodiments are susceptible to many modifications of form, arrangement of parts, details and order of operation. The disclosed embodiments are rather intended to encompass all such modification within the scope, as defined by the claims.

What is claimed is:

1. A method of operating a wireless handheld device, comprising:
   on receipt of a request to compose a message, displaying on a display of said wireless handheld device (i) a first recipient field of a first type for a recipient address, and (ii) a message composition field for holding message content;
   thereafter, upon receipt of a keystroke entry of text into said first recipient field:
   searching an address book for entries that match said text; and
   displaying on said display a first selection menu comprising any matching entries and a lookup option to look up matching entries from a remote address book hosted at a remote server;
   upon receipt of a subsequent keystroke entry of subsequent text into said first recipient field, altering said first selection menu to remove entries that do not match the text and the subsequent text;
   on receipt of an input corresponding to a selection of said lookup option:
   querying said remote server hosting said remote address book with a string representing said text;
   receiving matching entries in reply; and
   displaying a second selection menu comprising said entries from said remote address book which match said text,
   wherein said second selection menu further comprises said text with a count of said entries from said remote address book which match said text; and
   on receipt of an input corresponding to a selection of one of said matching entries:
   populating said first recipient field based on said selected one of said matching entries,
   ceasing to display said second selection menu on said display, and
   altering said display to add a second recipient field of said first type for a second recipient address to said display.

2. The method of claim 1 further comprising:
   thereafter, upon receipt of a second keystroke entry of text into said second recipient field:
   searching said address book for second entries that match text input into said second recipient field;
   displaying a third selection menu comprising any said second entries;
   upon receipt of a subsequent keystroke entry of second subsequent text into said second recipient field, altering said displayed third selection menu to remove entries that do not match the text and the second subsequent text input to the second recipient field; and
   on receipt of an input corresponding to a selection of one of said second entries:
   populating said second recipient field based on said selection of one of said second entries,
   ceasing to display said third selection menu on said display, and
   altering said display to add a third recipient field for a third recipient address of said first type to said display so that said third recipient field is displayed with said first recipient field, said second recipient field, and said message composition field.

3. The method of claim 1, wherein said message is to be sent with a given messaging service.

4. The method of claim 3, wherein each said matching entry is a recipient name associated with an address according to a protocol of said given messaging service.

5. The method of claim 3 further comprising, upon receipt of said input corresponding to the selection of one of said matching entries, when said selection is an address book entry associated with a recipient name not associated with an address according to a protocol of said given messaging service, generating a warning.

6. The method of claim 3, wherein said first recipient field is displayed with a first label and said second recipient field is displayed with a second label, said second label being identical to said first label.

7. The method of claim 6, wherein said first label and said second label indicate a "To:" field, a "Cc" field, or a "Bcc" field.

8. The method of claim 3, wherein said given messaging service is an e-mail service, a short messaging service, an instant messaging service, a personal identification number (PIN) messaging service, or a multi-media messaging service.

9. The method of claim 3, further comprising, upon receipt of a request to send said message, removing said second recipient field when the message is sent if no text has been entered into said second recipient field.

10. The method of claim 1, wherein receipt of an input corresponding to a selection of one of said matching entries comprises receiving a selection of an enter key and the one of said matching entries selected is a displayed matching entry displayed with highlighting in the second selection menu.

11. The method of claim 10, wherein displaying on said display a second selection menu comprising any matching entries comprises displaying a topmost one of the matching entries with highlighting.

12. The method of claim 2, wherein receipt of an input corresponding to a selection of one of said second entries comprises receiving a selection of an enter key and the one of said second entries selected is a displayed second entry displayed with highlighting in the third selection menu.

13. The method of claim 12, wherein displaying on said display the third selection menu comprising any second entries comprises displaying a topmost one of the second entries with highlighting.

14. A handheld device comprising:
   a persistent store;
   a keyboard for text entry;
   a display;
   a wireless transmitter;
   a controller operable to:
      upon receipt of a request to compose a message to be sent with a messaging service, display on said display (i) a first recipient field for a recipient address of a first type, and (ii) a message composition field for holding message content;
      thereafter, upon a keystroke entry of text into said first recipient field:
         search an address book for entries that match said text; and
         display on said display a first selection menu comprising any matching entries and a lookup option to look up matching entries from a remote address book hosted at a remote server; and
      upon receipt of a subsequent keystroke entry of subsequent text into said first recipient field, alter said first selection menu to remove entries that do not match the text and the subsequent text;
      on receipt of an input corresponding to a selection of said lookup option:
         query said remote server hosting said remote address book with a string representing said text;
         receive matching entries in reply; and
         display a second selection menu comprising said entries from said remote address book which match said text,
      wherein said second selection menu further comprises said text with a count of said entries from said remote address book which match said text; and
      on receipt of an input corresponding to a selection of one of said matching entries:
         populate said first recipient field based on said selected one of said matching entries,
         cease to display said second selection menu on said display and,
         alter said display to add a second recipient field of said first type for a second recipient address to said display.

15. The device of claim 14, wherein said controller is further operable to:
   thereafter, upon receipt of a second keystroke entry of text into said second recipient field:
      search said address book for second entries that match text input into said second recipient field;
      display a third selection menu comprising any said second entries;
   upon receipt of a subsequent keystroke entry of second subsequent text into said second recipient field, altering said displayed third selection menu to remove entries that do not match the text and the second subsequent text input to the second recipient field; and
   on receipt of an input corresponding to a selection of one of said second entries:
      populate said second recipient field based on said selection of one of said second entries,
      cease to display said third selection menu on said display and,
      altering said display to add a third recipient field for a third recipient address of said first type to said display so that said third recipient field is displayed with said first recipient field, said second recipient field, and said message composition field.

16. The device of claim 14, wherein said controller is further operable to:
   display said first recipient field with a first label and said second recipient field with a second label, said second label being identical to said first label.

17. The device of claim 16, wherein said controller is operable to send said message with an e-mail service, a short messaging service, an instant messaging service, a personal identification number (PIN) messaging service, or a multi-media messaging service.

18. The device of claim 14, wherein said controller is further operable to:
   upon receipt of a request to send said message, remove said second recipient field when the message is sent if no text has been entered into said second recipient field.

19. The device of claim 16, wherein said first label and said second label indicate a "To:" field, a "Cc" field, or a "Bcc" field.

20. The device of claim 14, wherein the controller is configured to display one of the matching entries of the second selection menus with highlighting, and wherein receipt of an input corresponding to a selection of one of said matching entries comprises receiving a selection of an enter key and the one of said matching entries selected is a displayed matching entry displayed with highlighting in the second selection menu.

21. The device of claim 20, wherein the controller is configured to display a topmost one of the matching entries with highlighting when displaying on said display the second selection menu comprising any matching entries.

22. The device of claim 15, wherein the controller is configured to display one of the second entries of the third selection menu with highlighting, and wherein receipt of an input corresponding to a selection of one of said second entries comprises receiving a selection of an enter key and the one of said second entries selected is a displayed second entry displayed with highlighting in the third selection menu.

23. The device of claim 22, wherein the controller is configured to display a topmost one of the second entries with highlighting when displaying on said display the third selection menu comprising any second entries.

24. A non-transitory computer-readable medium having stored thereon computer-readable code executable by a processor of a wireless handheld device to cause the processor to:
  on receipt of a request to compose a message, display on a display of said wireless handheld device (i) a first recipient field of a first type for a recipient address, and (ii) a message composition field for holding message content;
  thereafter, upon receipt of a keystroke entry of text into said first recipient field:
    search an address book for entries that match said text; and
    display on said display a first selection menu comprising any matching entries and a lookup option to look up matching entries from a remote address book hosted at a remote server;
  upon receipt of a subsequent keystroke entry of subsequent text into said first recipient field, alter said first selection menu to remove entries that do not match the text and the subsequent text;
  on receipt of an input corresponding to a selection of said lookup option:
    query said remote server hosting said remote address book with a string representing said text;
    receive matching entries in reply; and
    display a second selection menu comprising said entries from said remote address book which match said text;
  wherein said second selection menu further comprises said text with a count of said entries from said remote address book which match said text; and
  on receipt of an input corresponding to a selection of one of said matching entries:
    populate said first recipient field based on said selected one of said matching entries,
    cease to display said second selection menu on said display, and
    alter said display to add a second recipient field of said first type for a second recipient address to said display.

* * * * *